United States Patent

Takitani et al.

[11] Patent Number: 5,844,556
[45] Date of Patent: Dec. 1, 1998

[54] INTELLIGENT GRAPHIC OPERATION PANEL AND HIGHLIGHTING CONTOL METHOD

[75] Inventors: Yukitaka Takitani; Tetsuya Nishiki; Masahiro Sato; Kazuaki Date; Jun Aoki; Hiroshi Kitano; Masaharu Kakizoe; Shinji Sohma, all of Hiratsuka, Japan

[73] Assignee: Kabushiki Kaisha Komatsu Seisakusho, Tokyo, Japan

[21] Appl. No.: 374,555

[22] PCT Filed: Jul. 9, 1993

[86] PCT No.: PCT/JP93/00953

§ 371 Date: Jan. 17, 1995

§ 102(e) Date: Jan. 17, 1995

[87] PCT Pub. No.: WO94/29271

PCT Pub. Date: Dec. 22, 1994

[30] Foreign Application Priority Data

Jul. 17, 1992 [JP] Japan .................................. 4-191055
Sep. 30, 1992 [JP] Japan .................................. 4-261906

[51] Int. Cl.⁶ ..................................................... G06F 3/00
[52] U.S. Cl. ............................................................ 345/339
[58] Field of Search ................................. 395/155–161; 345/333, 334, 339, 348, 965

[56] References Cited

U.S. PATENT DOCUMENTS

| | | | |
|---|---|---|---|
| 4,718,025 | 1/1988 | Minor et al. | 364/550 |
| 4,805,089 | 2/1989 | Lane et al. | 364/188 |
| 4,910,658 | 3/1990 | Dudash et al. | 364/138 |
| 4,914,568 | 4/1990 | Kodosky et al. | 345/349 |
| 5,371,895 | 12/1994 | Bristol | 395/705 |

FOREIGN PATENT DOCUMENTS

| | | |
|---|---|---|
| 4-107726 | 4/1992 | Japan . |
| 2241629 | 1/1991 | United Kingdom . |
| 2282944 | 7/1994 | United Kingdom . |

OTHER PUBLICATIONS

Research Disclosure, Sep. 1989, No. 30535 "Animated Icons".
British Search Report.

*Primary Examiner*—A. Katbab
*Attorney, Agent, or Firm*—Diller, Ramik & Wight, PC

[57] ABSTRACT

Besides fixed display element information for merely displaying a fixed screen, variable display element information for variably displaying a variable display element whose display content changes, input element information representing the relationship of correspondence between the input means and an operation switch contained in a relevant component, and the operation program information for operating the relevant component as required, which are necessary for the relevant component to completely function as a component, are capable of being set and registered with respect to component data. In addition, the set and registered component is allowed to be handled in a component data unit when user screen data is generated. Accordingly, if the components are registered in a library, the possibility of use by a third party can be drastically increased, and the number of work steps during the screen generation by the user can be drastically decreased.

16 Claims, 23 Drawing Sheets

| |
|---|
| TYPE OF FIXED DISPLAY ELEMENT |
| UPPER LEFT END POINT X COORDINATE |
| UPPER LEFT END POINT Y COORDINATE |
| LOWER RIGHT END POINT X COORDINATE |
| LOWER RIGHT END POINT Y COORDINATE |
| CHAMFERING INFORMATION |
| LINE THICKNESS |
| LINE TYPE |
| LINE COLOR |
| BLOTTING COLOR |
| BLOTTING PATTERN |

| TYPE OF VARIABLE DISPLAY ELEMENT |
| --- |
| DISPLAY POSITION |
| DISPLAY FORMAT |
| POSITION OF DECIMAL POINT |
| CHARACTER FONT |
| SIZE OF NUMERAL |
| INTERVAL BETWEEN NUMERALS |
| NO. OF DIGITS OF NUMERAL |
| DISPLAY MODE |
| COLOR OF NUMERAL |

| TYPE | CODE | CONTENT |
|---|---|---|
| NORMAL DISPLAY | 0 | RESET THE FIGURE |
| HIGHLIGHT | 1 | CHANGE TO DESIGNATED FIGURE |
| BLINK | 2 | PERIODICALLY CHANGE BETWEEN DESIGNATED FIGURE AND NONHIGHLIGHTED FIGURE |
| SPECIAL BLINK | 3 | PERIODICALLY CHANGE BETWEEN DESIGNATED FIGURES |
| ANIMATION HIGHLIGHTING | 4 | CYCLICALLY DISPLAY ALL HIGHLIGHTED FIGURES SET IN AREA HIGHLIGHTING INFORMATION |

FIG.24

INTELLIGENT GRAPHIC OPERATION PANEL AND HIGHLIGHTING CONTOL METHOD

TECHNICAL FIELD

The present invention relates to an intelligent operation panel which is connected to various control devices of at a factory, a plant, a construction vehicle, a monitoring system, or the like and functions as a man-machine interface. More particularly, the present invention concerns an intelligent operation panel which has a display device for displaying various states of a system by using numerical values, characters, figures, graphs, and the like and input means for designating input states with respect to a ten-key or a numeric keypad and various switches displayed on the display device, and which is capable of generating an operation panel of an arbitrary display screen by using image-drawing software.

In addition, the present invention relates to a method of controlling highlighted display for displaying an object graphic image by highlighting the same.

BACKGROUND ART

In recent years, in the technical field for effecting the control, monitoring, and the like of production lines, disaster-prevention and security systems, and manufacturing plants, in conjunction with the trends toward sophisticated functions and complexity of the systems subject to control, input/output operation panels for displaying inputs to and outputs from the systems have become large in size and complex with increasing numbers of operation switches and display units. For this reason, from the point of view of manufacturers, there have arisen problems including a decline in productivity and higher costs of the operation panels due to a large number of types of operation panels.

Accordingly, in recent years, graphic operation panels have been proposed in which a transparent touch panel is superposed on a dot display unit to form an operation panel, and display screen data for the operation panel to be displayed on the dot display unit can be generated freely by a user by using image-drawing software (e.g., Japanese Patent Application Laid-Open No. 190909/1990).

According to this type of graphic operation panel, an operating instruction can be imparted to the system by pressing a position on the touch panel corresponding to an operation switch rendered on the display unit, and various states of the system can be displayed on the display unit. The display screen data for the operation panel, which are generated by the user, are registered and stored in memory incorporated in the operation panel.

The graphic operation panel for which the generation of the screen has been completed is usually connected to external control devices, such as a sequencer, a host computer, and various control devices, within the system being used via various interfaces. In accordance with instructions from the external control devices and internal processing, the graphic operation panel visually displays through figures and graphs information concerning, for instance, the operating condition of the manufacturing plant, the position of an automated guided vehicle, display data from various sensors, notification of abnormalities, and the like, and functions to notify switch inputs and the like to the aforementioned external control devices.

According to conventional graphic operation panels of this type, an arrangement provided is such that graphic images, characters, and marks of a high frequency of use can be registered as files during the generation of the display screen, and, when necessary, the registered files can be invoked, as required, on the display screen during generation, so as to generate the display screen.

With this conventional art, however, those which can be registered as files are the fixed display element data necessary for displaying fixed display elements which do not change with a change with each state. Therefore, in the case of those, such as a numeric keypad, which, in order to allow their functions to be completely realized, require, besides the aforementioned fixed display element data (rendering data for rendering the numeric keypad), variable display element data for variably displaying a designated key, touch panel data for defining the coordinate positional relationship between the rendered numeric keypad and the touch panel, and an operation program for the functioning as the numeric keypad, even if only a portion concerning the fixed display element in the numeric keypad screen is rendered by copying a file corresponding to the numeric keypad registered as a file onto a certain screen, the numeric keypad does not function on the screen unless the variable display element data, the touch panel data, and the operation program other than the same are set and registered on the screen.

Accordingly, in the conventional art, even if the fixed display element of the numeric keypad registered in advance as a file is copied onto a certain screen, the variable display element data, the touch panel data, and the operation program, which are necessary for the functioning of the numeric keypad, must be reset from the outset when the screen is generated.

Namely, in the operation panel of this type, in a case where, for instance, the function of the numeric keypad is to be realized, the following elements are required:

a fixed display element for rendering a fixed display element, such as a numeric keypad, a frame, and the like in the numeric keypad screen a portion for displaying a designated key (variable display element)

an operation program element for the functioning of the numeric keypad

However, in the above-described conventional art, even in the case of those in which a plurality of elements are combined to function, these elements cannot be handled as one collective set of information, and that which can be registered as a file and whose file can be copied, among the above-mentioned four elements, is only the fixed display element. For this reason, with the conventional art, the elements other than the fixed display element must be reset anew from the outset after the generation of the screen, so that there is a problem in that the number of work steps during the screen generation becomes large.

In addition, according to the graphic operation panels of this type, since processing which can be effected on the graphic operation panel side, such as the changing of the screens, display change control of the variable display elements, and simple numerical computing processing (input check of upper and lower limit values), has hitherto been carried out on the external control device side, there have been problems in that a processing burden imposed on the external control device side is large, and that the processing involved in communication between these devices is complex.

In display devices using displays such as a CRT, liquid-crystal panel, or the like, highlighting display for blinking characters and figures is carried out to attract the attention of the operator. Namely, with this blinking system, a graphic image subject to highlighting is erased at intervals of a fixed time duration by displaying the object graphic image to be highlighted, such as a figure and characters, such that the object graphic image periodically assumes the same gradation and color as those of the background. With this method, however, since the object graphic image is completely erased even temporarily, this method cannot be adopted in a situation where an object cannot be allowed to be unseen even for a short duration.

In addition, in display devices using displays such as a CRT, liquid-crystal panel, or the like, the above-described highlighting display is carried out by changing the hue. With this method, however, in a situation where the number of usable colors is limited, there arises a situation in which a complementary color is inevitably designated as a blinking color, so that there occurs a situation in which the hue of the object graphic image is close to the hue of its background, or the contrast is small, thereby making the graphic image difficult to see. In addition, although there is a method of effecting highlighting by changing the hue periodically, there arise drawbacks similar to those described above.

The present invention has been devised in view of the above-described circumstances, and its object is to provide an intelligent graphic operation panel which is capable of efficiently effecting screen-generating/editing operation, and alleviating a processing burden imposed on an external control device connected thereto.

Another object of the present invention is to provide a method of controlling highlighted display which is capable of effecting highlighted display easily discernable by the operator.

DISCLOSURE OF THE INVENTION

In accordance with the present invention, there is provided an intelligent graphic operation panel comprising: a memory for registering in advance for each screen unit a plurality of pieces of user screen data including display screen data for displaying a screen for displaying various states and inputting signals; a display device for displaying the registered display screen data; and input means for designating a form of input with respect to an operation switch for signal input in the display screen being displayed on the display device, the intelligent graphic operation panel executing a required display operation in accordance with an instruction from an external control device connected thereto and internal processing, and the intelligent graphic operation panel having a function of transmitting information on the operation switch to the external control device, characterized in that a component registering area in which arbitrary component data can be registered is provided in the memory, that required information among fixed display element information for displaying a fixed display element whose display content is fixed, variable display element information for variably displaying a variable display element whose display content changes, input element information representing a relationship of correspondence between the input means and the operation switch contained in the relevant component, and operation program information for operating the relevant component as required is made capable of being set and registered in correspondence with each component with respect to the registering area for each piece of component data, and that the processing of generation of the user screen data which is registered in the memory is allowed by using the set and registered component data as a unit.

In accordance with the above-described invention, besides fixed display element information for merely displaying a fixed screen, variable display element information for variably displaying a variable display element whose display content changes, input element information representing the relationship of correspondence between the input means and an operation switch contained in a relevant component, and the operation program information for operating the relevant component as required, which are necessary for the relevant component to completely function as a component, are capable of being set and registered with respect to component data. For this reason, required ones of these items of information can be set and registered in accordance with the components. In addition, the set and registered component can be handled in a component data unit when user screen data is generated.

Therefore, in accordance with the present invention, since all the necessary data for allowing the component to function as a component is contained in the component data, if the component data is registered once, all the information necessary for the function of the component on the screen can be simply set and registered without performing new registration operation and program editing operation, by simply generating a required operation panel screen by invoking the registered component data as it is onto the required display screen. Accordingly, if the components are registered in a library, the possibility of use by a third party can be drastically increased, and the number of work steps during the screen generation by the user can be drastically decreased. Furthermore, since the operation program for the functioning of the component is set and registered in the component data, it is possible to alleviate the processing burden imposed on an external control device connected to the intelligent graphic operation panel.

In addition, the present invention is characterized in that, in a method of controlling highlighted display for displaying an object graphic image by highlighting the same, the method comprises the steps of: allotting a predetermined highlighted graphic image for the respective object graphic image; and during highlighted display, changing the allotted highlighted graphic image to the object graphic image so as to effect highlighted display.

In accordance with the above-described invention, when a figure or characters are highlighted, the graphic image itself is changed to a predetermined highlighted graphic image allotted in advance thereto, instead of the blinking or changing of the hue as in a conventional case, so that highlighted display which can be more readily discernible by the operator can be effected.

In addition, in the present invention, in a method of controlling highlighted display for displaying an object graphic image by highlighting the same, comprising the steps of: allotting a highlighted graphic image for the respective object graphic image; and during highlighted display, changing the allotted highlighted graphic image and the object graphic image to each other periodically so as to effect highlighted display.

In addition, in the present invention, in method of controlling highlighted display for displaying an object graphic image by highlighting the same, comprising the steps of: allotting two or more highlighted graphic images for the respective object graphic image; during highlighted display, changing the object graphic image to one of the two or more highlighted graphic images, and then cyclically changing the two or more highlighted graphic images in a predetermined sequence so as to effect highlighted display.

BRIEF DESCRIPTION OF THE DRAWINGS

FIG. 24 is a table diagram illustrating types of highlighted display;

BEST MODE FOR CARRYING OUT THE INVENTION

Hereafter, a detailed description will be given of the present invention in accordance with the embodiments shown in the appended drawings.

Figure 2:
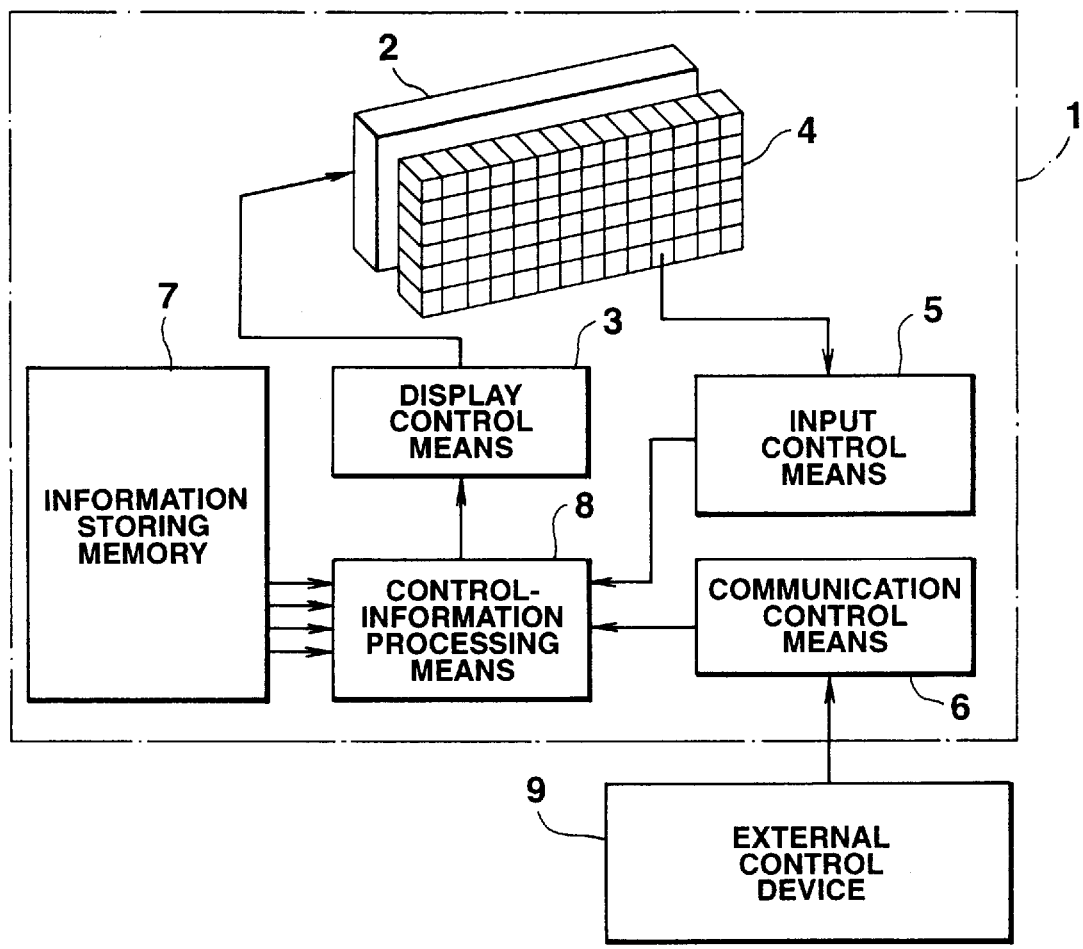
FIG. 2 is a diagram illustrating an example of an internal configuration of an intelligent graphic operation panel in accordance with the present invention.

FIG. 2 illustrates an example of the configuration of an intelligent operation panel in accordance with the present invention.

In FIG. 2, an intelligent operation panel 1 is comprised of a display unit 2, a display control means 3, an input means 4, an input control means 5, a communication control means 6, an information-storing memory 7, and control-information processing means 8, and is connected to an external control device 9 via the communication control means 6. The external control device 9 includes a sequencer, a host computer, various control devices, and the like, and executes, for instance, control and monitoring of a production line, control and monitoring of material handling, control and monitoring of a disaster-prevention and security system, monitoring of a process in a manufacturing plant, or the like.

The display unit 2 is a display unit such as a CRT, a liquid-crystal display, a plasma display, an EL display, or the like, and a display screen which arbitrarily combines elements for displaying various states and inputting signals is displayed on the display unit 2. The display screen is constituted by various graphic images such as characters, figures, numerical values, and graphs. The display control means 2 includes a storage section for storing display information and an information processing section for processing the display information, and controls the display operation of the display unit 1 in accordance with an operating instruction from the control-information processing means 3.

In this case, it is assumed that a transparent touch panel switch is used as the input means 4, and this transparent touch panel switch 4 is superposed on the display unit 1. Namely, in this transparent touch panel switch, a plurality of small membrane switches which respond to pressure are arranged in matrix form within an effective switch surface, and input-position information which indicates which switch has been designated by the operator is outputted to the input control means 5.

The input control means 5 converts the input-position information from the input means 4 into a data format of a configuration capable of being processed by the control-information processing means 8, and transmits the same to the control-information processing means 8.

The communication control means 6 has communication interfaces such as RS232C, RS422, RS485, Ethernet (TCP/IP protocols, DEC Net protocol, etc.), GP-IB, and parallel I/O, and executes data transmission to and reception from the external control device 9.

User screen data generated by the user are stored in the information-storing memory 7. It should be noted that, when the display screen is generated, the user usually connects this graphic operation panel 1 to an arbitrary personal computer, generates an arbitrary screen by using attached image-drawing software, and registers and stores the generated screen data in the information-storing memory 7.

Figure 3:
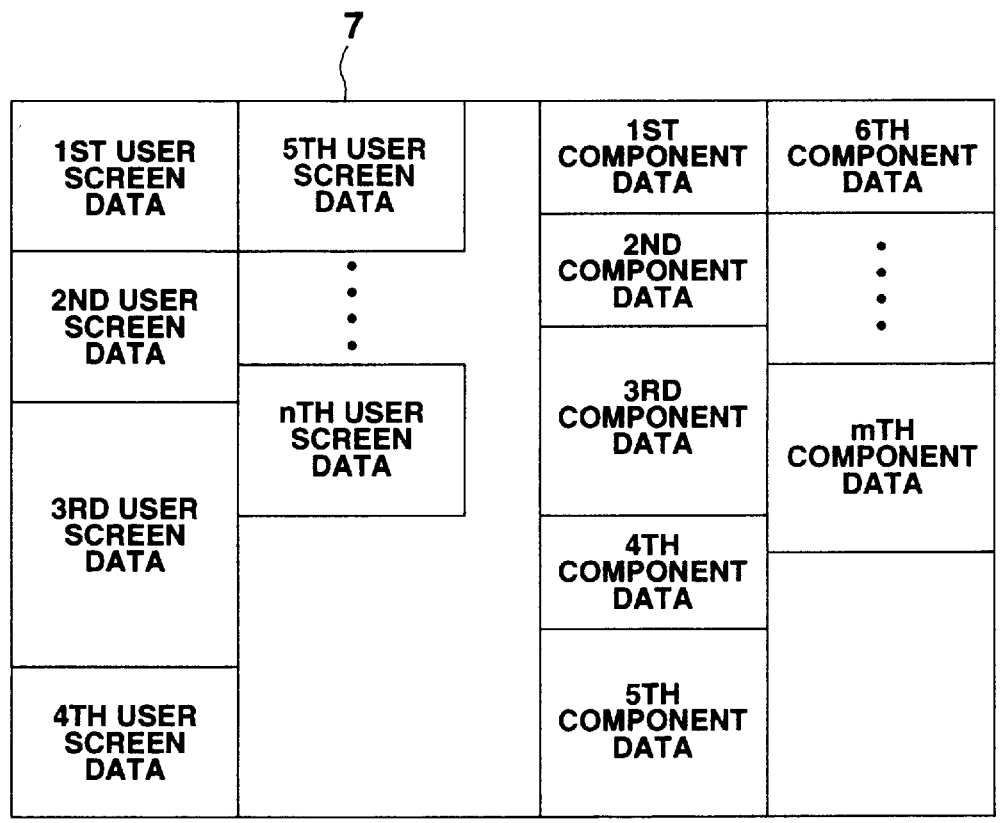
FIG. 3 is a diagram illustrating the contents stored in the information-storing memory.

FIG. 3 illustrates an example of the user screen data stored in the information-storing memory 7. In this case, a plurality of sheets (n sheets) of screen data generated by the user are registered and stored. In addition, a plurality of pieces (m pieces) of "component" data, which, if stored once, can be invoked on an arbitrary display screen and can be used when generating a screen, such as a numeric keypad, various operation switches, and a display meter, are also registered and stored. As for the details of the user screen data and the component data, a description will be given later.

Figure 4:
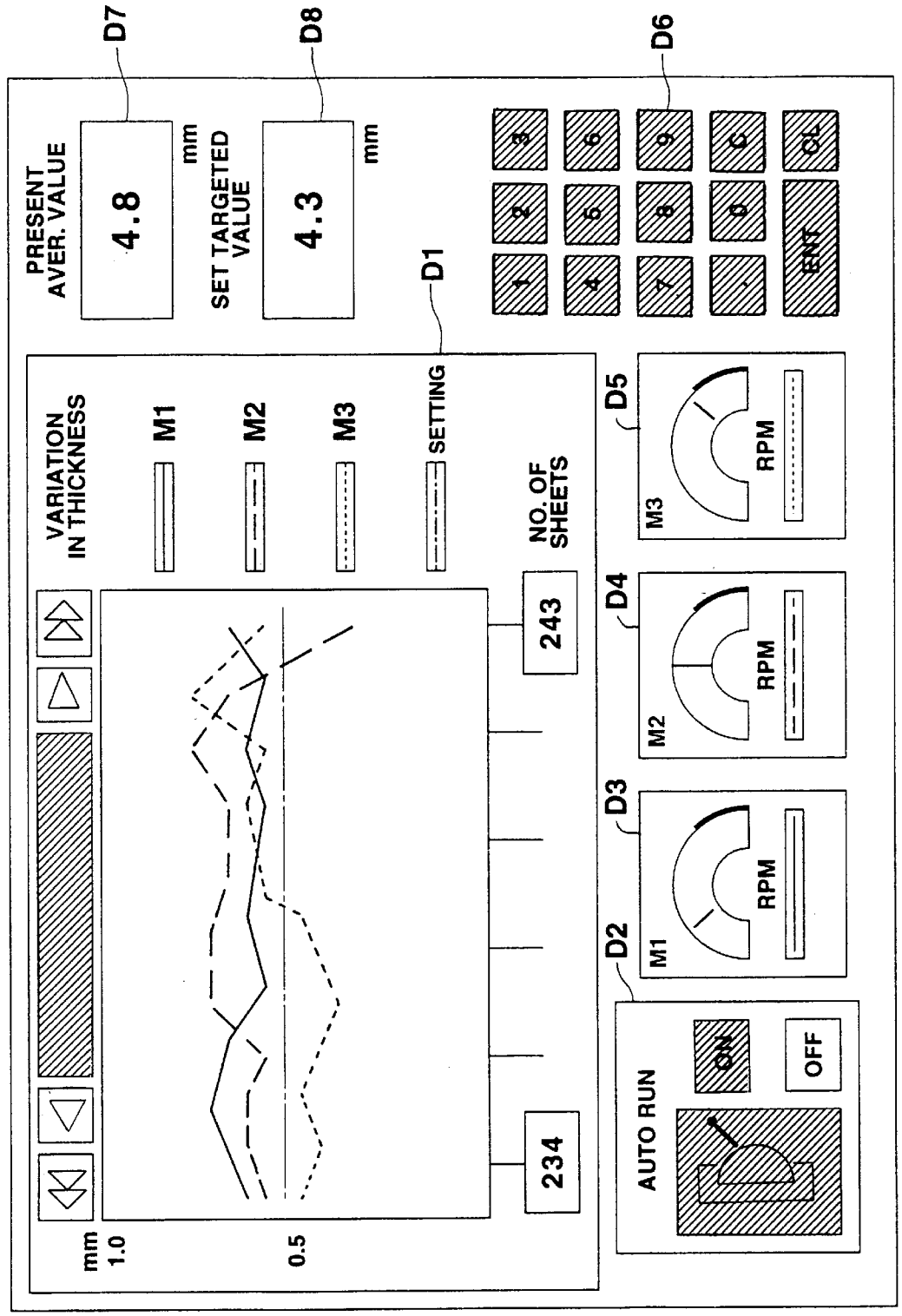
FIG. 4 is a diagram illustrating an example of the display screen.

FIG. 4 illustrates one display screen, and this display screen is made up of a line-graph display portion D1, an automatic run operation switch portion D2, three analog display meters D3 to D5, a numeric keypad portion D6, a present-average-value display portion D7, and a set targeted-value display portion D8.

Here, in this display screen, the line-graph display portion D1, the automatic run operation switch portion D2, the three analog display meters D3 to D5, and the numeric keypad portion D6, excluding the present-average-value display portion D7 and the set targeted-value display portion D8, are respectively "components," but the present-average-value display portion D7 and the set targeted-value display portion D8 are not components.

However, in this graphic operation panel, the component data are constituted by not only fixed display element information for merely displaying a fixed screen display, but are also composed of variable display element information whose display contents change in correspondence with changes of various states, input element information defining the coordinate positional relationship between an operation switch in the rendered display data and the touch panel 4, and operation program information for achieving a function peculiar to the component. In other words, when a screen is generated, the component which contains the fixed display element information, the variable display element information, the input element information, and the operation program information is collectively processed as a group, as will be detailed later.

Figure 1:
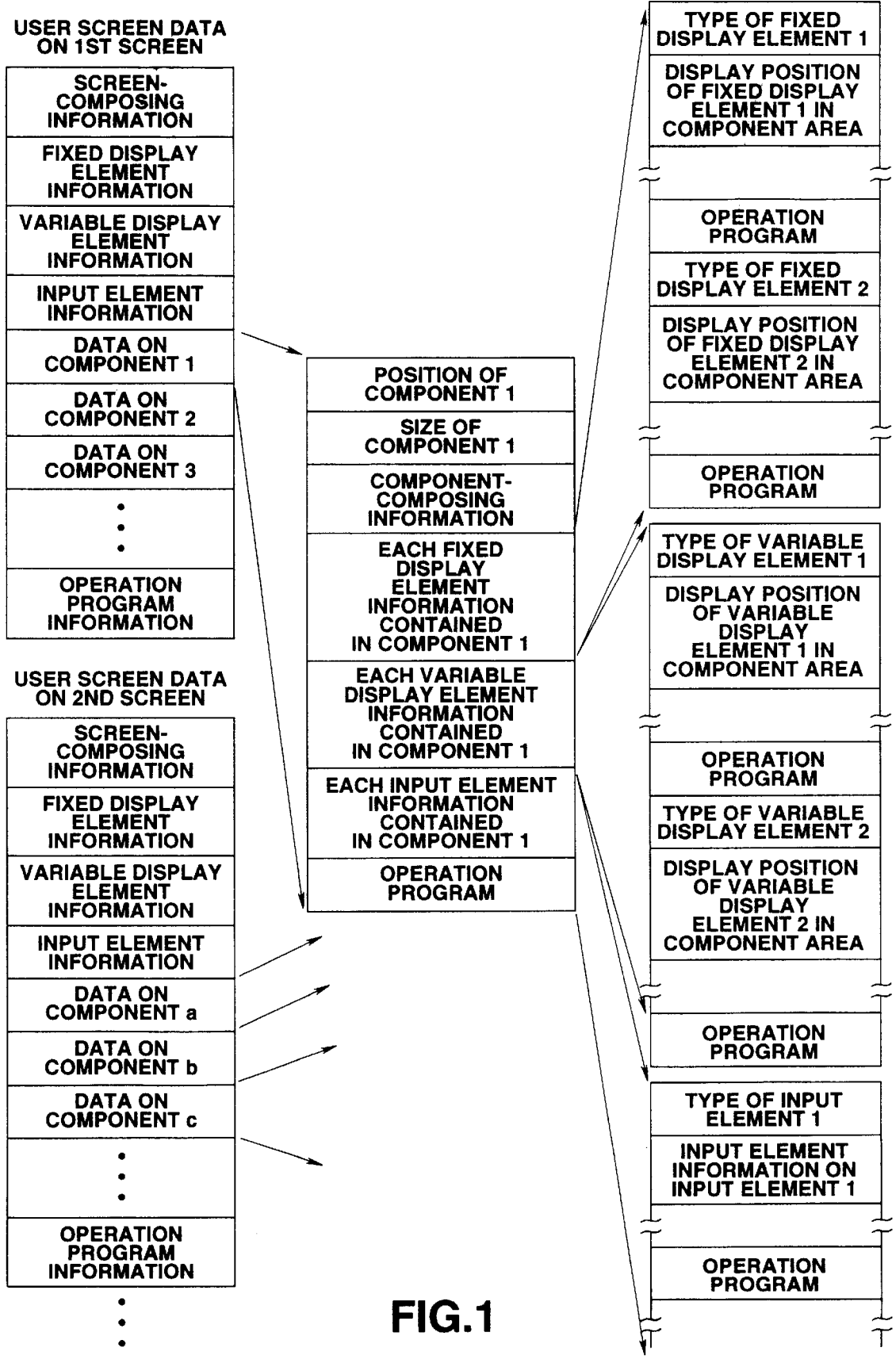
FIG. 1 is a diagram illustrating a data structure of data of one display screen stored in an information-storing memory.

FIG. 1 shows a format for storing one set of user screen data which are stored in the information-storing memory 7 after the screen is generated by the user.

Namely, one set of user screen data includes:

(a) screen-composing information (b) fixed display element information (c) variable display element information (d) input element information (e) component data contained in the relevant screen (f) operation program information First, a description will be given of (b) fixed display element information and (c) variable display element information.

The fixed display element is fixedly displayed indefinitely without the displayed contents being altered during the period when the overall screen is not completely changed to another screen. The fixed display element is used, for instance, as a background of the screen. This fixed display element information may, of course, exist as being incidental to one screen, or may be contained in a component screen.

The variable display element is newly displayed or its display content may be changed in accordance with a request from the external control device 9 or an operating instruction via the input means 4. For instance, the variable display elements include numerical-value display elements representing values of sensors and various states of machines, character-string display elements, figure display elements, various graph display elements, and the like. This variable display element information may also exist as being incidental to one screen, or may be contained in the component screen.

Figures 5, 6:
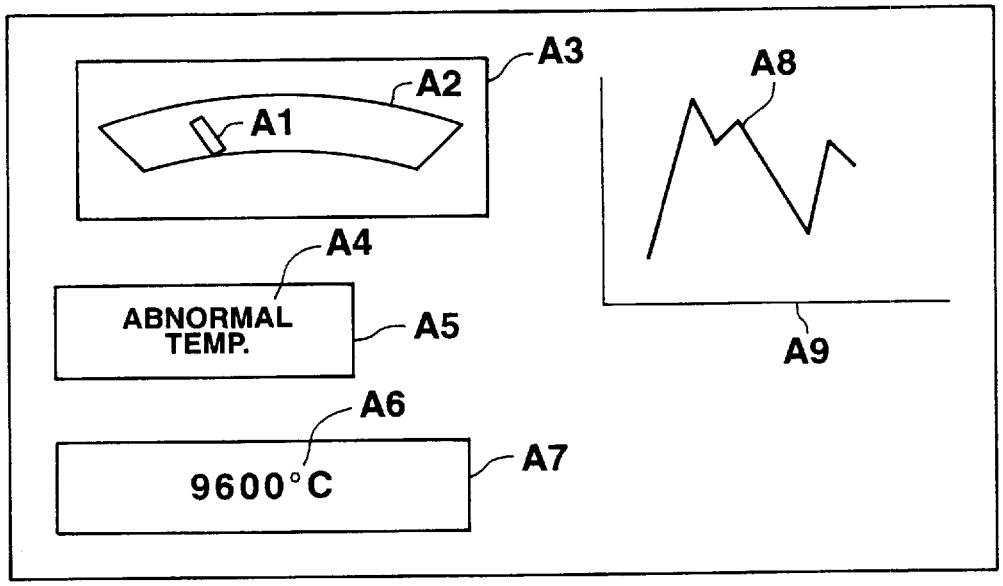
FIG. 5 is an explanatory diagram of fixed display elements and variable display elements.
FIG. 6 is a diagram illustrating a data structure of fixed display element information.

For instance, in the screen in FIG. 5, the upper left figure representing an analog meter is a variable display element in which the display position of only a figure element A1 representing a meter needle changes in correspondence with an input value, and the other fan-shaped figure A2 and rectangular frame A3 are fixed display elements. In addition, the central left figure in FIG. 5 is a variable display element in which characters A4, "ABNORMAL TEMPERATURE," are displayed or not displayed in correspondence with a state, and a rectangular frame A5 around them is a fixed display element. Further, the figure at lower left in FIG. 5 is a variable display element in which the numerical value of character portions A6, "9600° C.," varies in correspondence with temperature data, and a rectangular frame A7 around them is a fixed display element. Furthermore, the figure representing a line graph at upper right is a variable display element in which the form of the polygonal line of a polygonal line portion A8 changes with data, and a scale frame A9 around it is a fixed display screen.

That is, the fixed display screen information includes the type of the relevant fixed display element (whether it is a character or a figure; if it is a figure, distinction between a rectangular shape and a circle, or the like), display position information, attribute data indicating various attributes of figures, and so on. FIG. 6 shows an example of a data structure in a case where a rectangular vector figure is used as the fixed display element.

In addition, the variable display element information includes the type of the relevant variable display element, display position information, attribute data indicating various attributes of figures, and so on. FIG. 6 shows an example of a data structure in a case where a numerical value is used as the variable display element.

Here, in the display screen in FIG. 4 referred to earlier, the line-graph display portion D1, the automatic run operation switch portion D2, the three analog display meters D3 to D5, and the numeric keypad portion D6 are respectively components, and the present-average-value display portion D7 and the set targeted-value display portion D8 are not components, as described above. Accordingly, in this case, the display contents shown in FIG. 8, in which the components are excluded from the display screen of FIG. 4, need to be set as the fixed display element information and variable display element information which belong to the relevant user screen data. In addition, in the present-average-value display portion D7 and the set targeted-value display portion D8 shown in FIG. 8, character data C1 representing the "PRESENT AVERAGE VALUE," character data C2 representing "SET TARGETED VALUE," frame lines C3, C4, and unit display portions C5, C6 (mm in this case) constitute the fixed display element information, while numerical data (4.8 and 4.3 in this case) within the frame lines C3 and C4 constitute the variable display element information.

Next, a description will be given of (d) input element information.

To make up the operation panel, in addition to the aforementioned fixed display element information and variable display element information, information for providing corresponding between the coordinates of the touch panel 4 and the coordinates of each operation switch rendered on the display screen is required, and this information will be referred to as "input element information." That is, the input element information plays the role of allotting the input of the transparent touch switch 4 to the operation switch among the display elements on the screen. This input element information may also exist as being incidental to one screen, or may be contained in the component data.

Figure 9:
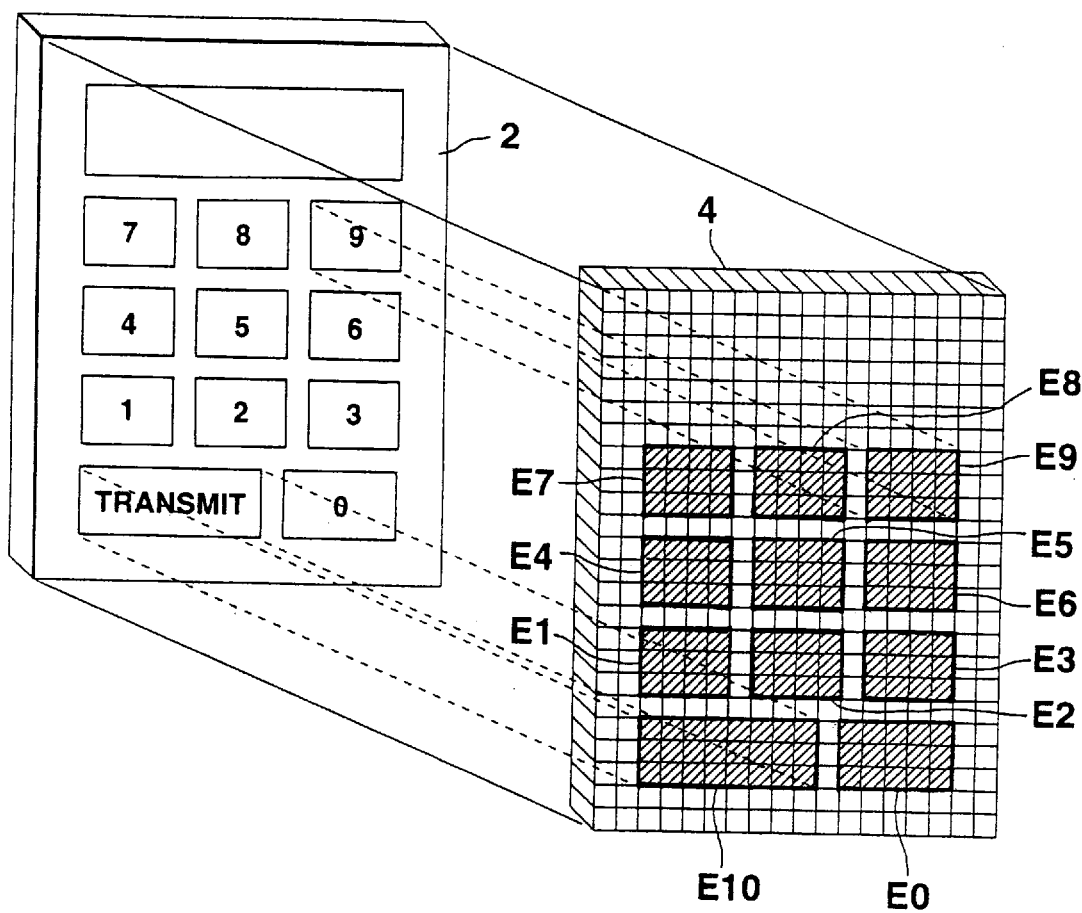
FIG. 9 is a diagram explaining input element information by illustrating a numeric keypad by way of example.

For instance, FIG. 9 illustrates the numeric keypad portion by extracting the same, and a transparent touch panel, in which a plurality of touch switches are arranged in matrix form as the input means 4, is superposed on the display screen on which a numeric keypad screen is generated. In this case, the input elements are constituted by information for causing the switches contained in 10 areas surrounded by thick lines on the touch panel 4 to correspond to 10 display switches on the display panel 2 side, respectively.

Namely, in this case, the display area "TRANSMIT" on the display unit 2 side corresponds to an area E10 on the touch panel 4 side. Similarly, the display area "0" corresponds to a touch area E0; the display area "1" corresponds to a touch area E1; the display area "2" corresponds to a touch area E2; the display area "3" corresponds to a touch area E3; the display area "4" corresponds to a touch area E4; the display area "5" corresponds to a touch area E5; the display area "6" corresponds to a touch area E6; the display area "7" corresponds to a touch area E7; the display area "8" corresponds to a touch area E8; and the display area "9" corresponds to a touch area E9.

Figures 7, 8:
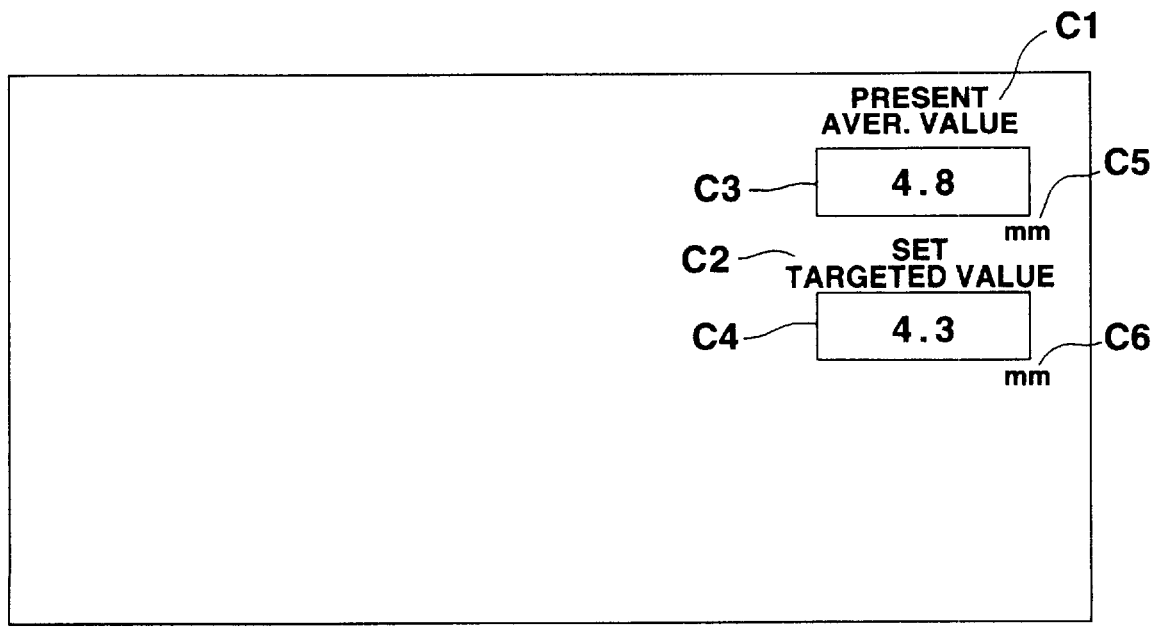
FIG. 7 is a diagram illustrating a data structure of variable display element information.
FIG. 8 is a diagram illustrating a screen in which components are excluded from the display screen shown in FIG. 4.

Here, in the above-described display screen of FIG. 4, the display contents shown in FIG. 8 are not components, and the data other than the same are component data. In addition, since no operation switch is present in the display contents shown in FIG. 8, there is no input element information in the display screen data of FIG. 4. In the component data belonging to the display screen of FIG. 4, there are, of course, component data in which the input element information is present. Namely, since operation switches are present in the line-graph display portion D1, the automatic run operation switch portion D2, and the numeric keypad portion D6 in the component data belonging to the display screen in FIG. 4, input element information is present in these component data. However, since operation switches are not present in the analog meters D3 to D5 among these components, the input element information is not present in the component data corresponding to the analog meters D3 to D5.

Next, a description will be given of (f) operation programs.

For the operation of the operation panel, operation program information in which required operating procedures concerning the details of the setting of the relevant display screen is required in addition to the above-described elements.

This operation program information can be arbitrarily generated and registered by the user, and may exist as being incidental to one screen, or may be contained in the component data.

Operation programs made incidental to the screen mainly include the following:

(1) a procedure concerning the transmission and reception of data with respect to an external control device (2) a procedure concerning the revision of display contents on the relevant screen (3) a procedure concerning arithmetic processing in the relevant screen The operation programs include, for instance, the following:

First step: Data at address A000 in the storage area of the memory in the external control device 9 is fetched every 10 minutes.

Second step: Nothing is done if the fetched data is not more than a prescribed value.

Third step: The screen is changed to another screen if the fetched data is greater than the prescribed value.

In the above-described operation programs, the first step is an example of the operation program (1), the second step is an example of the operation program (2), and the third step is an example of the operation program (3).

Incidentally, when the operation program is incidental to component data, a required procedure for executing operation peculiar to that component is written in the operation program.

Next, a description will be given of (a) screen-composing information.

The screen-composing information is a display screen unit or a component unit (in the case of a component, it is referred to as component-composing information), and is information for defining the relationship among the fixed display element information, the variable display element information, the input element information, the component information, and the operation program which are contained in its areas. By referring to the screen-composing information, it is possible to define the information which makes up the display screen or component. In addition, this screen-composing information includes address information representing the positions at which the fixed display element information, the variable display element information, the input element information, the component information, and the operation program which belong to the relevant display screen are stored in the information-storing memory 7.

The screen-composing information which is present in display screen units is made up by, for example, the following:

The presence or absence of the fixed display element information, and a start address of a storage area in the information-storing memory 7 in which each of the fixed display elements is stored, as well as their data lengths The presence or absence of the variable display element information, and a start address of a storage area in the information-storing memory 7 in which each of the variable display elements is stored, as well as their data lengths The presence or absence of the input element information, and a start address of a storage area in the information-storing memory 7 in which each of the input element information is stored, as well as their data lengths The presence or absence of components, and a start address of a storage area in the information-storing memory 7 in which each of the component data is stored, as well as their data lengths The presence or absence of the operation program, and a start address of a storage area in the information-storing memory 7 in which the operation program is stored, as well as its data length.

Next, a description will be given of the component data.

Once the components are registered, the components can be used arbitrarily on each display screen when the screen is generated, as described above, and the following are conceivable as the components.

numeric keypad
analog meter
menu bar
digital switch
various keyboards numerical value display character display figure display, etc.

Component data which enable such components to function as components include the following:

the position of the relevant component on the display screen the size of the relevant component component-composing information fixed display element information contained in the relevant component variable display element information contained in the relevant component input element information contained in the relevant component operation program information for operating the component The component-composing information corresponds to the aforementioned screen-composing information, and includes the following:

The presence or absence of the fixed display element information in the relevant component, and a start address of a storage area in the information-storing memory 7 in which each of the fixed display elements is stored, as well as their data lengths The presence or absence of the variable display element information in the relevant component, and a start address of a storage area in the information-storing memory 7 in which each of the variable display elements is stored, as well as their data lengths The presence or absence of the input element information in the relevant component, and a start address of a storage area in the information-storing memory 7 in which each of the input element information is stored, as well as their data lengths The presence or absence of the operation program in the relevant component, and a start address of a storage area in the information-storing memory 7 in which the operation program is stored, as well as its data length.

In addition, items of the fixed display element information contained in the component data include the following:

the type of the relevant fixed display element the position of the relevant fixed display element displayed in the component area the operation program for operating the relevant fixed display element In addition, items of the variable display element information contained in the component data include the following:

the type of the relevant variable display element the position of the relevant variable display element displayed in the component area the operation program for operating the relevant variable display element In addition, items of the input element information contained in the component data include the following:

the type of the relevant input element (distinction among a rotary switch, a toggle switch, a momentary switch, etc.)

input element information concerning the relevant input element the operation program for operating the relevant input element Thus, in this apparatus, since the operation program for operating the display screen as required is attached to the user screen data making up one display screen, and the component operation program for allowing the component to function is set and registered among the component data, if a desired screen is designated and a display request is issued from the external control device 9, a required display operation is effected automatically on the graphic operation panel 1 side. Accordingly, a processing burden imposed on the external control device 9 connected to the intelligent graphic operation panel can be alleviated substantially as compared to a conventional example.

Figure 10:
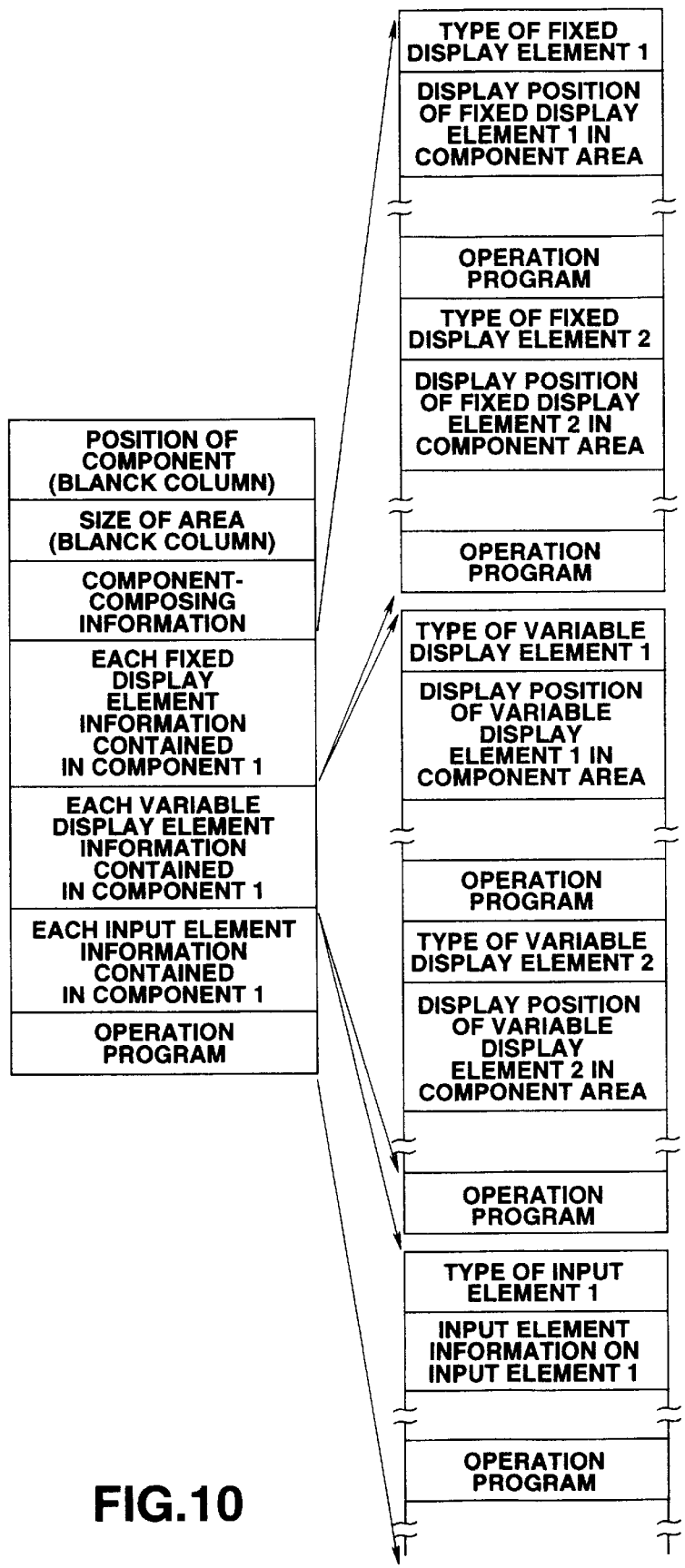
FIG. 10 is a diagram illustrating a data structure of registered component data.

FIG. 10 shows the data structure of component data registered as a component, and its structure is basically not different from component data which is present in the display screen data.

However, in the case of the registered component data, since the display position, the size of the component, and the like have not been determined, a column for entering the display position of the component on the display screen is left vacant, or appropriate initial coordinates are set. Also, a column for entering the size of the component is left vacant, or appropriate initial coordinates are set.

In FIG. 2, the control-information processing means 8 receives a request for operation from the external control device 9 or an operator's request via the input means 4, and has the function of issuing a display or input command or issuing a command corresponding to the content by interpreting the operation program, by referring to the user screen data in the information-storing memory 7 corresponding thereto.

Figure 11:
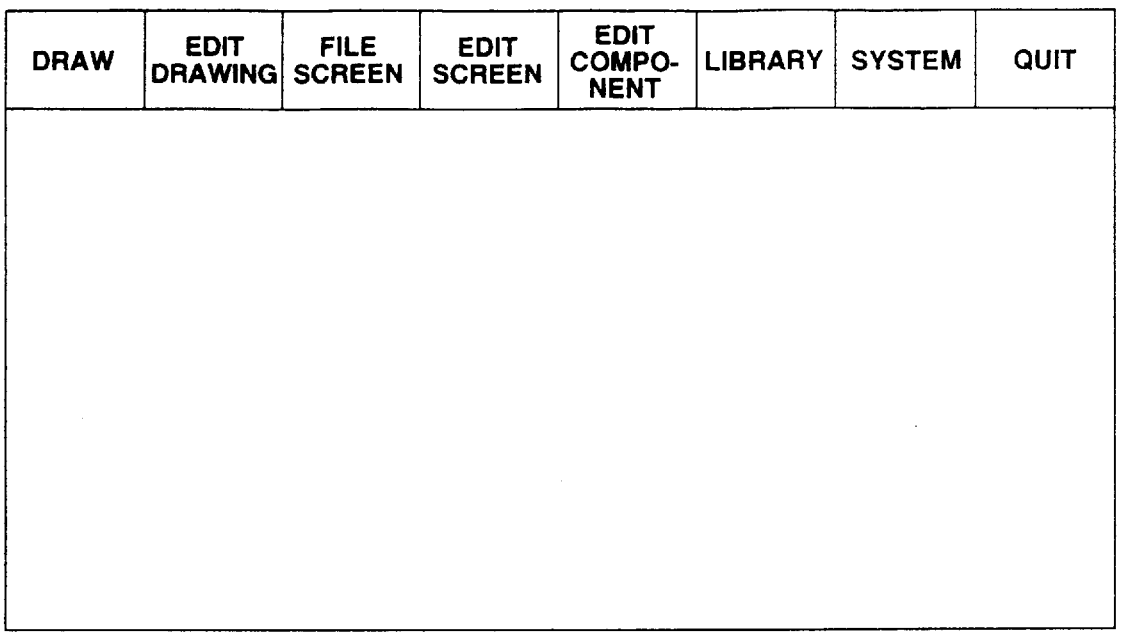
FIG. 11 is a diagram illustrating an operation screen of an entire menu for the generation and editing of a screen.
Figure 12:
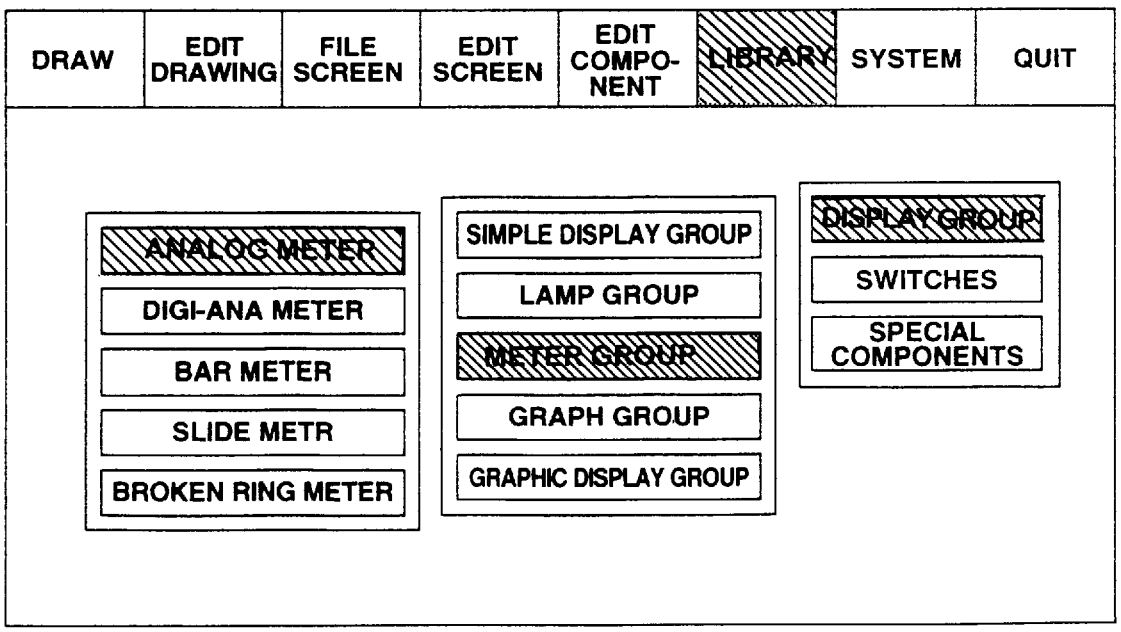
FIG. 12 is a diagram illustrating an operation screen for selecting a component type.
Figure 13:
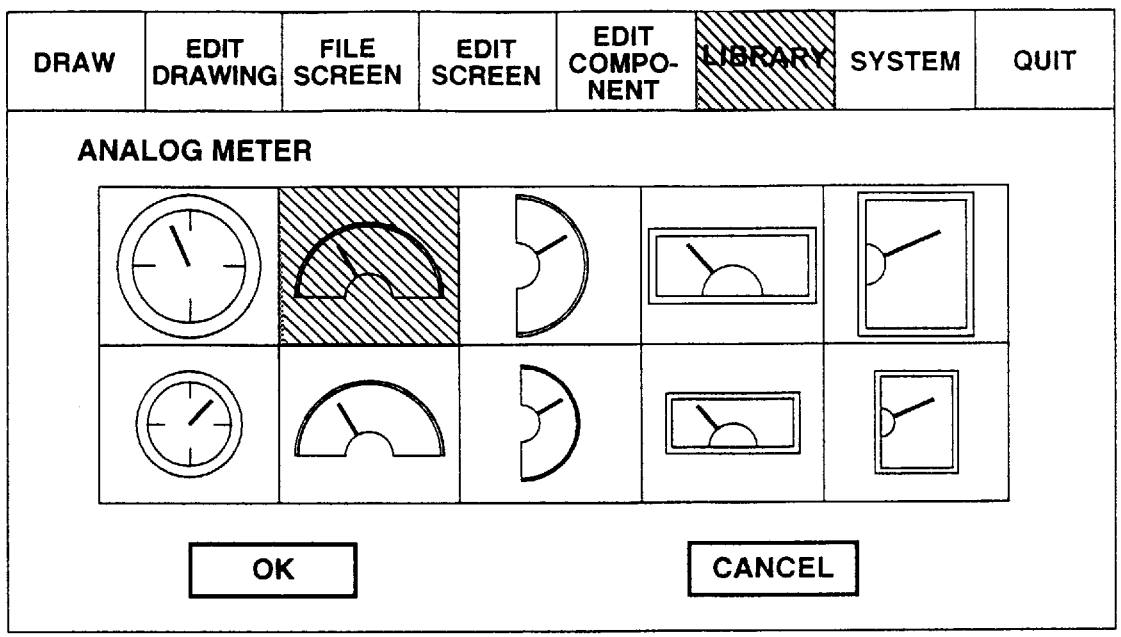
FIG. 13 is a diagram illustrating an operation screen for invoking a component type.
Figure 14:
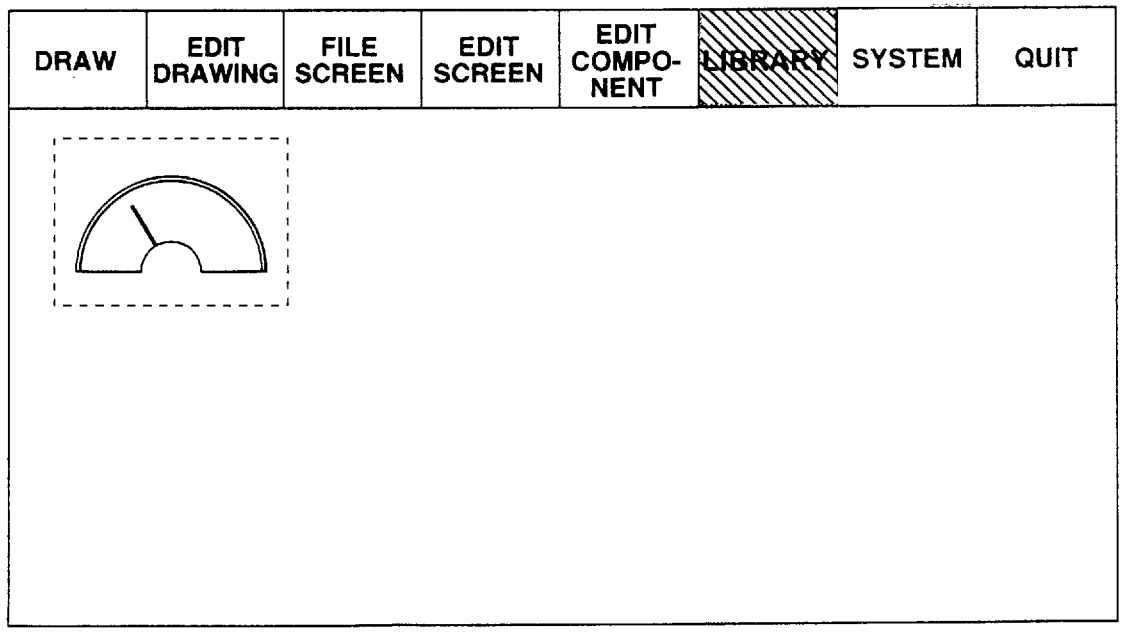
FIG. 14 is a diagram illustrating an operation screen for confirming the position of a component.
Figure 15:
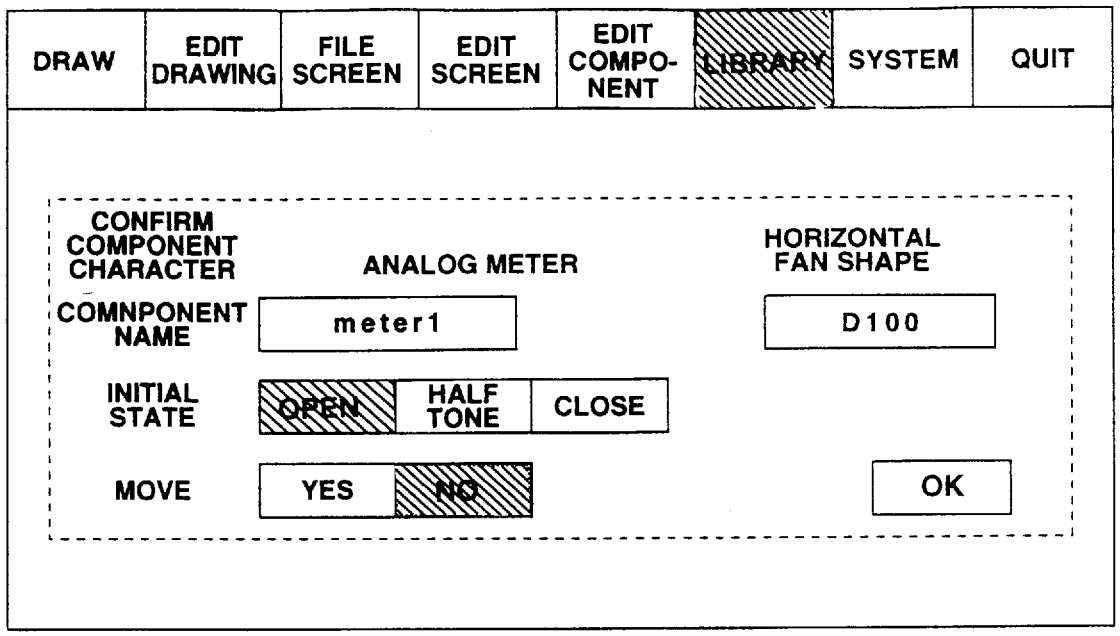
FIG. 15 is a diagram illustrating an operation screen for determining the character of a component.
Figure 16:
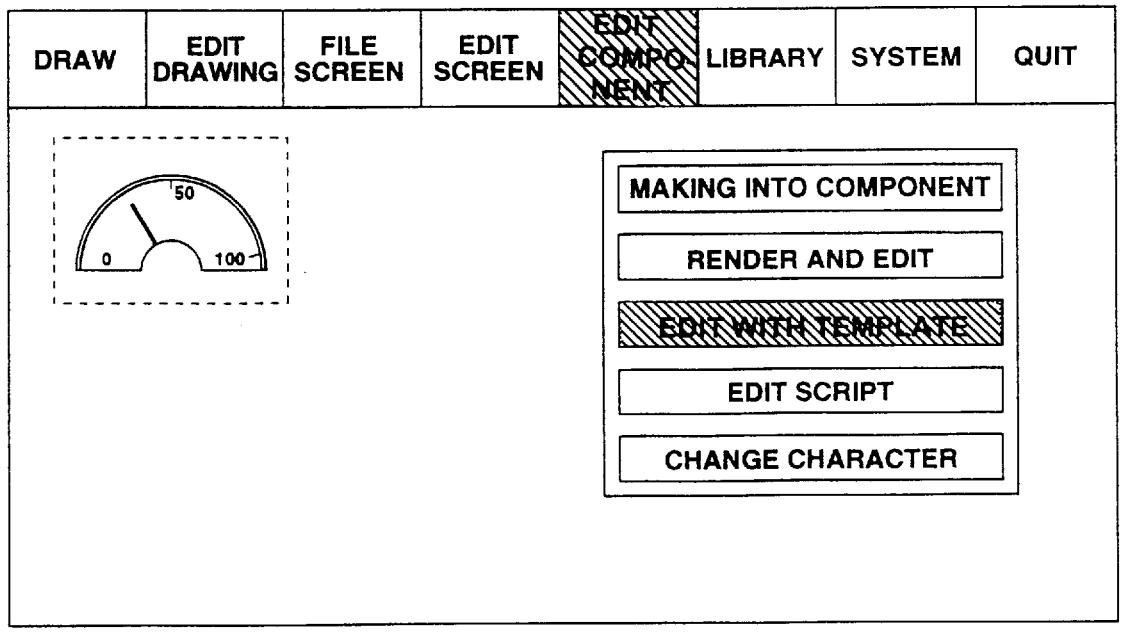
FIG. 16 is a diagram illustrating an operation screen for selecting a component correction mode.
Figure 17:
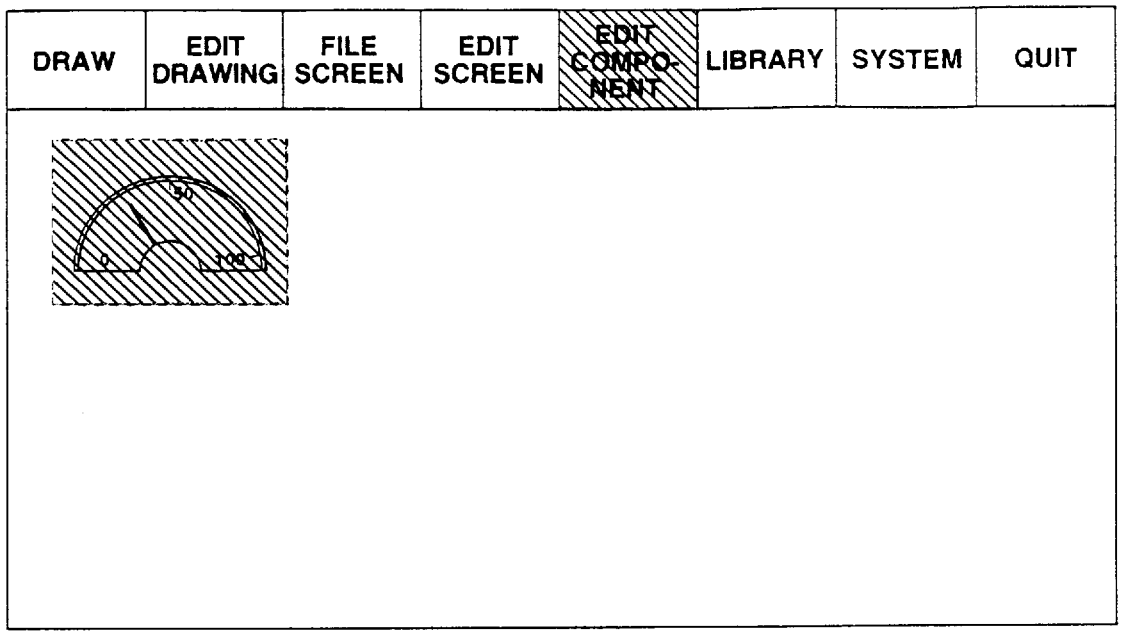
FIG. 17 is a diagram illustrating an operation screen for selecting a component subject to editing.
Figure 18:
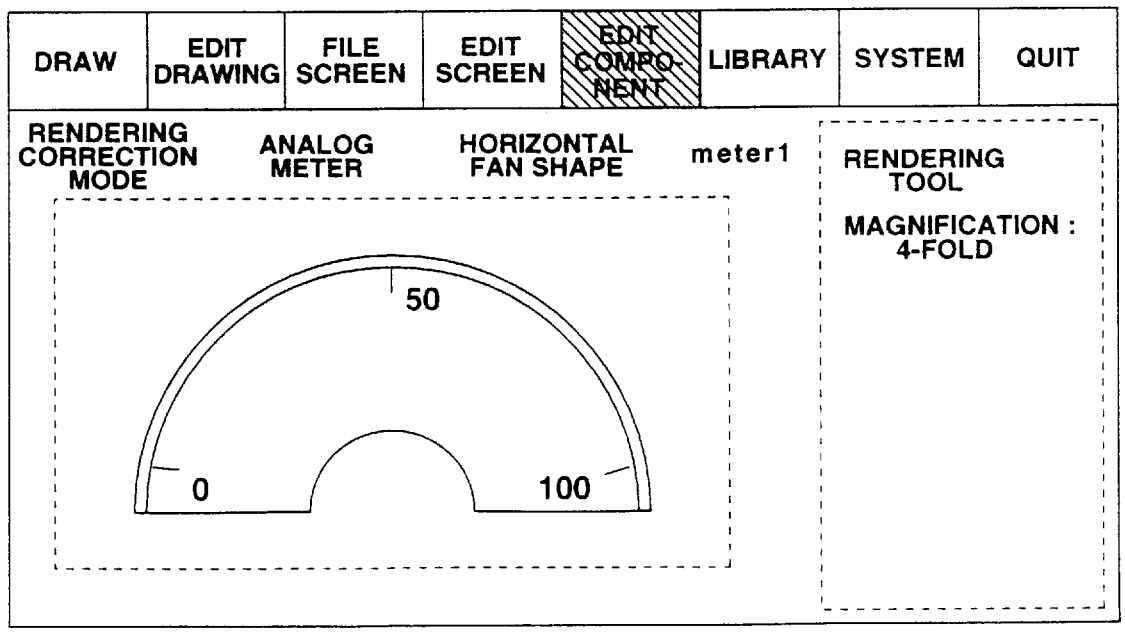
FIG. 18 is a diagram illustrating an operation screen for correcting the rendered details of the component.
Figure 19:
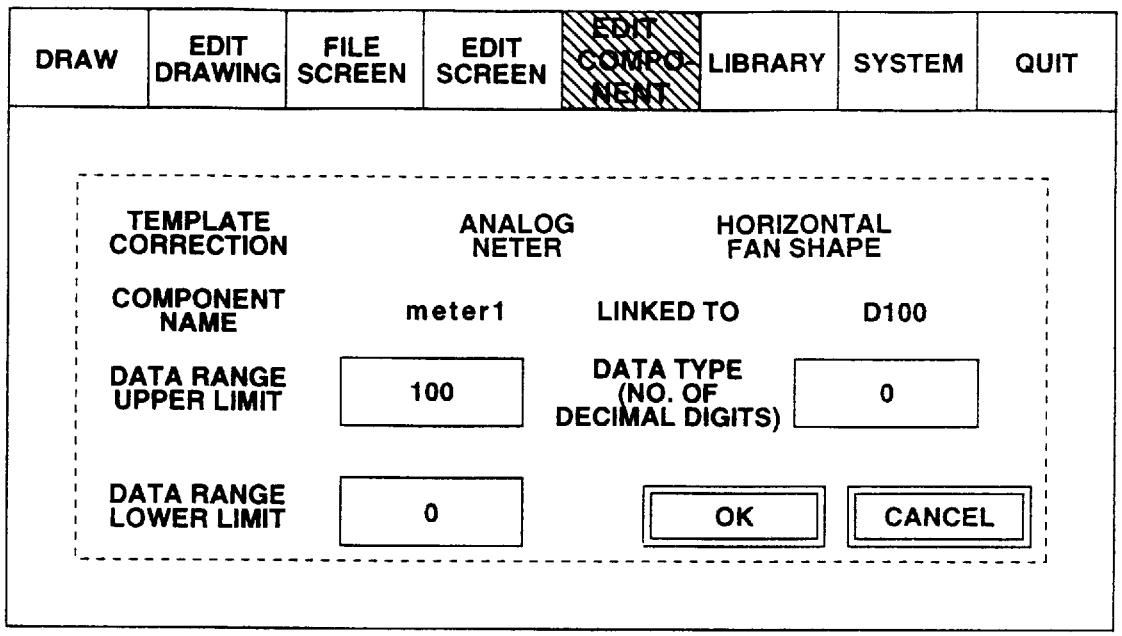
FIG. 19 is a diagram illustrating an operation screen for correcting the character of a component by using a template.

FIGS. 11 to 19 show examples of the operation screen on the personal computer for generating and editing the display screen or components, in which FIG. 11 shows the operation screen illustrating the overall menu; FIG. 12 shows the operation screen for selecting the component types; FIG. 13 shows the operation screen when the components are invoked; FIG. 14 shows the operation screen for confirming the position of the component; FIG. 15 shows the operation screen for determining the character of the component; FIG. 16 shows the operation screen for selecting a component correction mode; FIG. 17 shows the operation screen for selecting a component subject to editing; FIG. 18 shows the operation screen for correcting the rendered details of the component; and FIG. 19 shows the operation screen for correcting the character of the component by using a template.

Figure 20:
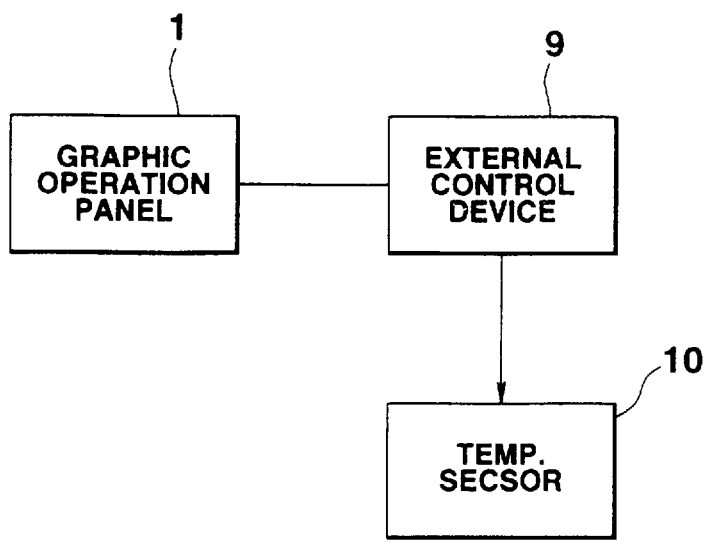
FIG. 20 is a diagram illustrating an example of connection to an external control device to which a temperature sensor is connected.
Figure 21:
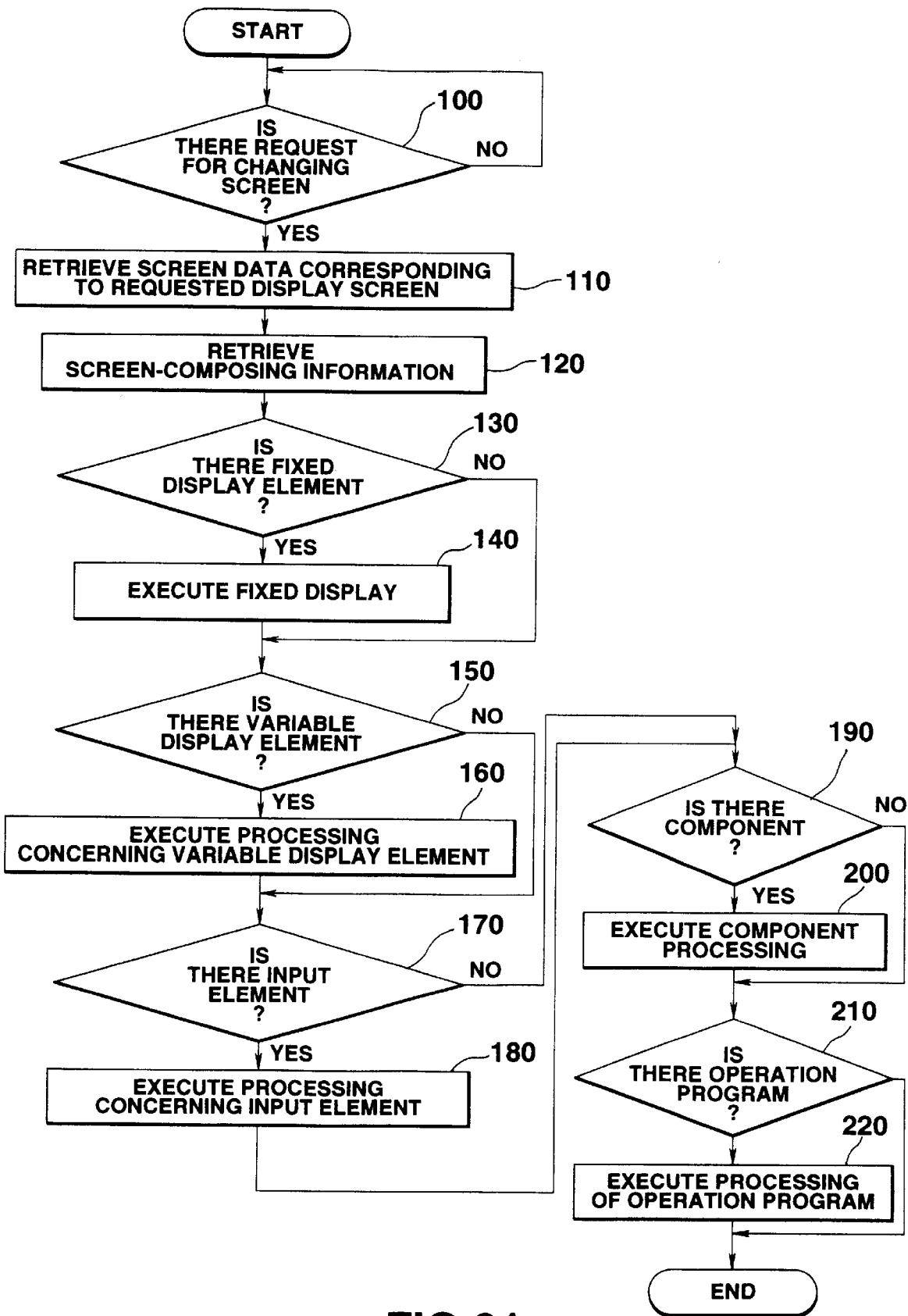
FIG. 21 is a diagram illustrating an example of operation for a request for changing the screen.
Figure 22:
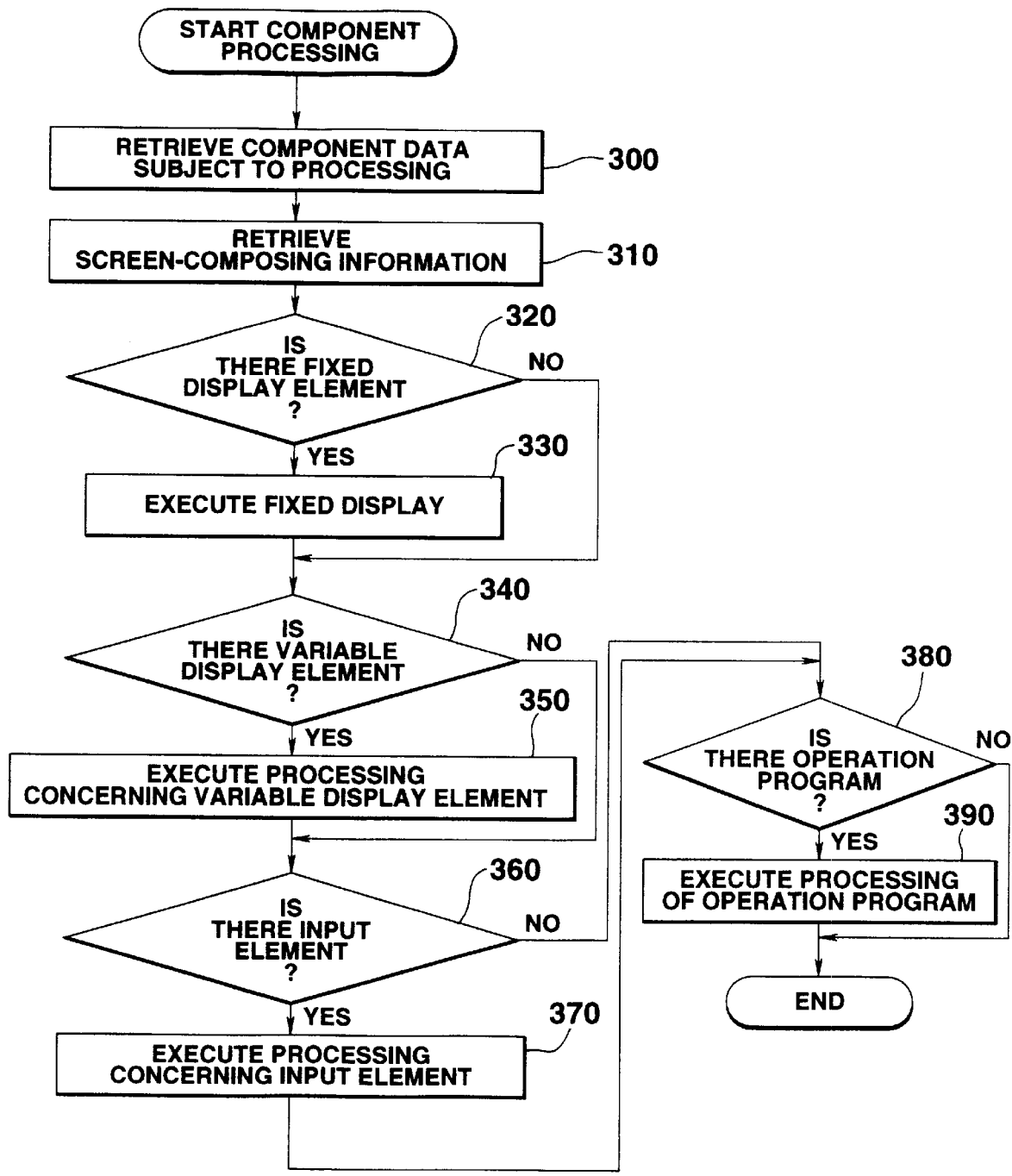
FIG. 22 is a diagram illustrating an example of operation of component processing.

Next, referring to the flowcharts shown in FIGS. 21 and 22, a description will be given of the operation in a case where a request for a change of the screen (a request for changing the display to the screen for notifying the occurrence of an abnormality or the like) has been inputted from the external control device 9 to the graphic operation panel 1 since a temperature sensor 10 has shown an abnormality in a situation where the temperature sensor 10 is connected to the externally connected device 9, as shown in FIG. 20.

Upon receipt of the request for a change of the screen via the communication control means 6 (Step 100), the control-information processing means 8 retrieves the user screen data corresponding to the requested display screen from the information-storing memory 7 (Step 110). Then, the control-information processing means 8 first refers to the screen-composing information among them, and searches from the information-storing memory 7 the fixed display element information, the variable display element information, the input element information, and the operation program which make up the requested display screen, and, if component data is present, the control-information processing means 8 searches from the information-storing memory 7 the fixed display element information, the variable display element information, the input element information, and the operation program which are contained in the component data. Then, if all the information and operation programs are generated, the control-information processing means 2 issues to the display control means 3 a display command for performing the display operation in accordance with the contents (Steps 130 to 220, Steps 300 to 390). In addition, the control-information processing means 2 interprets the contents of operation by referring to the operation programs. For instance, if processing to the effect that "the overall screen is made to blink" is written in the operation information, an instruction to that effect is issued to the display control means 3. The display screen is changed in the above-described manner.

Next, referring to the flowchart shown in FIG. 23 and citing an example in which the component is the numeric keypad shown in FIG. 9, a description will be given of the operation of the control-information processing means 8 and the contents of the operation program contained in the numeric-keypad component data.

Here, a description will be given starting with the operation when the numeric keypad is invoked on the screen.

Upon receipt of a request for invoking the numeric keypad from the external control device 9, the control-information processing means 8 retrieves the numeric keypad component data from the information-storing memory 7, and secures an area for the numeric keypad by referring to the data representing the position of the component data and the size of the component in the component data. Next, by referring to the component-composing information in the component data, the control-information processing means 8 searches various information and the operation program contained in the component data from the information-storing memory 7.

In the case of the numeric keypad, it is possible to search the following information from the screen-composing information:

fixed display element information for forming a background of the respective portions of the numeric keypad→a rectangular frame and a character string information on input elements for 10 transparent touch switches corresponding to numerals "0 to 9" (positions of corresponding panel switches, sizes of their areas, the operation of the switches, etc.)

information on input elements of the transparent touch switch corresponding to "TRANSMIT"→ditto information on numerical-value display elements, size of numeral, color of numeral, the direction in which the numerical value is filled in, etc.

operation information in which the operation of the numeric keypad is written

After searching the above information, the control-information processing means 8 performs the following processing.

(1) The control-information processing means 8 delivers to the display control means 3 the fixed display element information for displaying the background of the respective portions of the numeric keypad, and issues a display instruction.

(2) The control-information processing means 8 extracts from each input element information data for imparting the positional relationship between the operation switch to be set and the transparent touch switch 4, and delivers the same to the input control means 5.

(3) In this state, the control-information processing means 8 is set on standby.

It is assumed that the transparent touch switch 4 at the position corresponding to the numeral "7" is pressed subsequently. The pressing of the switch 4 is notified from the touch switch 4 to the input control means 5 as the switch position information. By referring to the data which gives the positional relationship between the operation switch and the transparent touch switch, the input control means 5 determines the pressed operation switch, and notifies the control-information processing means 8 that there has been an input request to an input element.

Figure 23:
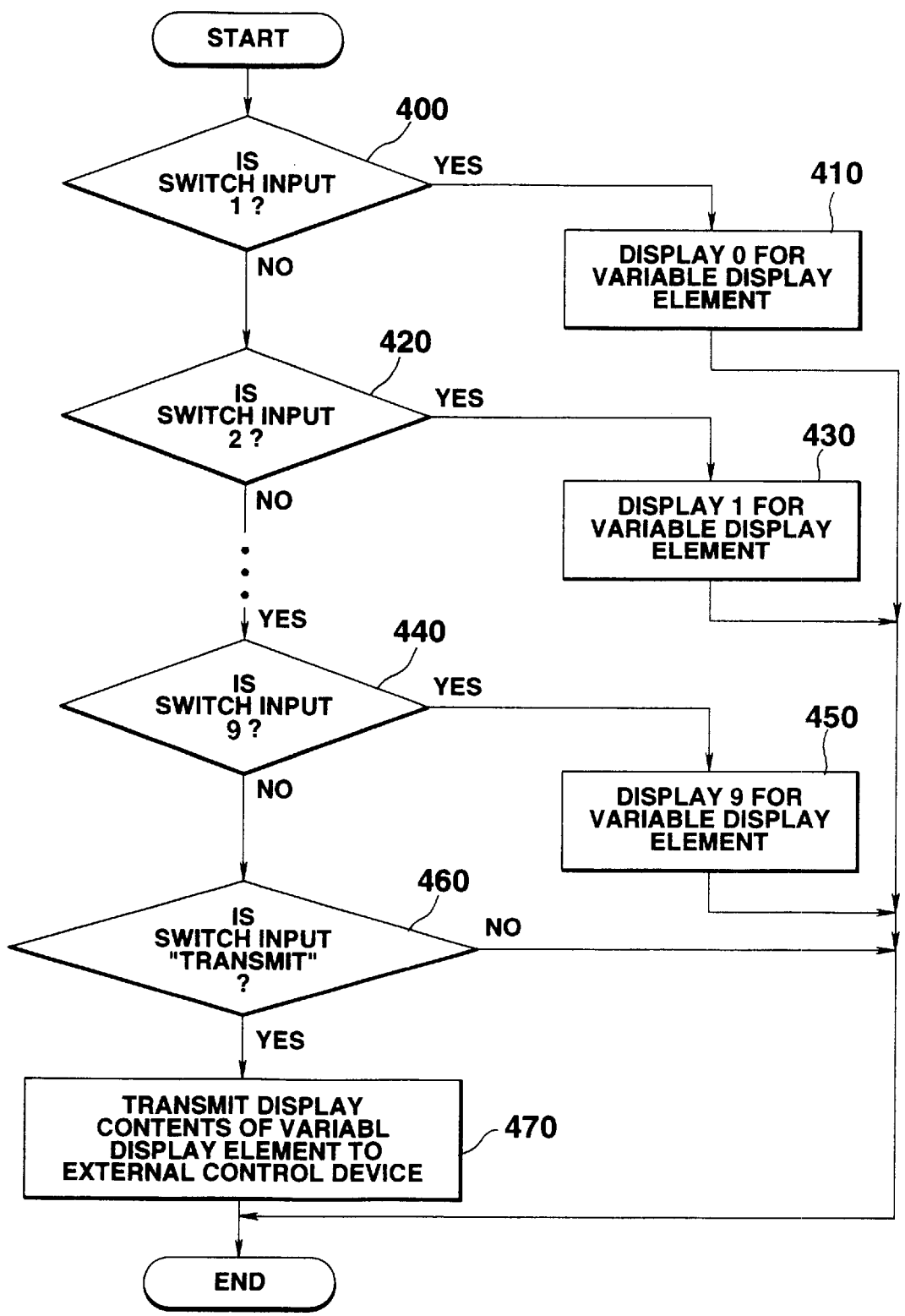
FIG. 23 is a diagram illustrating an example of an operation program contained in numeric keypad component data.

Upon receipt of this request, the control-information processing means 8 checks the operation program in the numeric keypad component data. The operation of the numeric keypad corresponding to various requests is written in the operation program. In the case of this numeric keypad, it is assumed that the following operation is written:

(a) If the pressed logic switches are switches corresponding to the numerals "0to 9," an instruction is issued to the display control means 3 to display the respectively corresponding numerals at predetermined positions of the variable display elements in accordance with the set conditions (Steps 400 to 450 in FIG. 23).

(b) If the pressed logic switch is a switch corresponding to "TRANSMIT," the display contents of the variable display element are delivered to the communication control means 5, and an instruction to transmit the same to the external control device 9 is issued (Steps 460 and 470 in FIG. 23).

In this case, processing is effected under the assumption that the switch corresponding to "7" in (a) has been pressed, so that the control-information processing means 8 issues to the display control means 3 a request for causing the display element to display "7." Consequently, "7" is displayed at the position of the variable display element within the numeric keypad.

Next, it is assumed that the panel switch at the position of "TRANSMIT" has been pressed. Processing is effected in a manner similar to the above-described case, and the control-information processing means 8 is notified by the input control means 5 that there has been an input request to the input element corresponding to "TRANSMIT." The control-information processing means 8 determines that the operation contents of (b) above should be performed this time, then delivers "7" being displayed on the variable display element to the communication control means 6, and issues an instruction to transmit the same to the external control device 9. Consequently, "7" entered from the numeric keypad is transmitted to the external control device.

Thus, in accordance with the memory structure of this intelligent graphic operation panel, besides the fixed display element information for merely displaying a fixed screen, the variable display element information for variably displaying a variable display element whose display contents change, input element information representing the relationship of correspondence between the input means and an operation switch contained in the relevant component, and the operation program information for operating the relevant component as required, which are necessary for the relevant component to completely function as a component, are capable of being set and registered with respect to the component data. Accordingly, once the required component data are registered, all the necessary information for allowing the component to function as a component on the screen can be set and registered simply by directly invoking required ones of the components registered during the generation of the user screen data.

It should be noted that although, in the above-described embodiment, when a screen is generated and edited, the operation panel 1 is connected to a personal computer, and the screen is generated on the personal computer side, an arrangement may be alternatively provided such that display screen data for displaying an ordinary keyboard, as well as display screen data for displaying the contents corresponding to the operation of the keyboard, are registered in advance in the information-storing memory 7 of this graphic operation panel, such that the screen can be generated and edited by the operation of the keyboard via the touch panel.

In addition, although, in the above-described embodiment, pressure-sensitive touch switches are used as the input means 4, magnetic transparent touch switches, electrostatic-induction type transparent touch switches, or optical transparent touch switches may be alternatively used. Furthermore, function switches or the like of the keyboard may also be used.

Furthermore, an arrangement may be provided such that the input elements and the variable display elements are made not to be able to belong to screen data which is not a component, and they are made to exist only in the component data.

Next, a description will be given of a second embodiment of the present invention.

First, a description will be given of the kinds of display highlighting which is effected in this second embodiment.

FIG. 24 is a table showing the kinds thereof, and the following are provided: (1) normal display, (2) highlighting mode, (3) blink mode, (4) special blink mode, and (5) animation highlighting mode.

(1) Normal Display

When a code corresponding to this normal display is designated, the mode is reset from any one of the states (2) to (5) of highlighting display to the state of normal display.

(2) Highlighting Mode

Figure 25A:
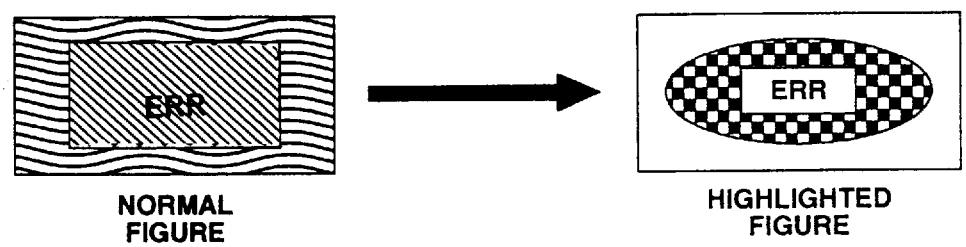
FIG. 25 is a diagram illustrating forms of display in a highlighting mode.
Figure 25B:
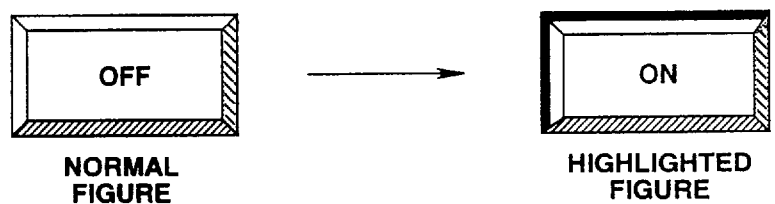

When a code corresponding to this highlighted display is designated, a normal figure is changed to a highlighted figure, as shown in the parts (a) and (b) of FIG. 25. The part (b) of FIG. 25 shows a case where highlighted display is applied to a toggle switch which has only two states, on and off. If it is assumed that a switch has been thrown by some input means (a mouse or a touch switch) with respect to a switch which is in the OFF state being displayed on the display screen, the normal figure is rendered as a switch showing the OFF state, and the highlighted figure is rendered as a switch showing the ON state so as to display the state as a result of the throwing of the switch, i.e., the ON state.

(3) Blink Mode

Figure 26A:
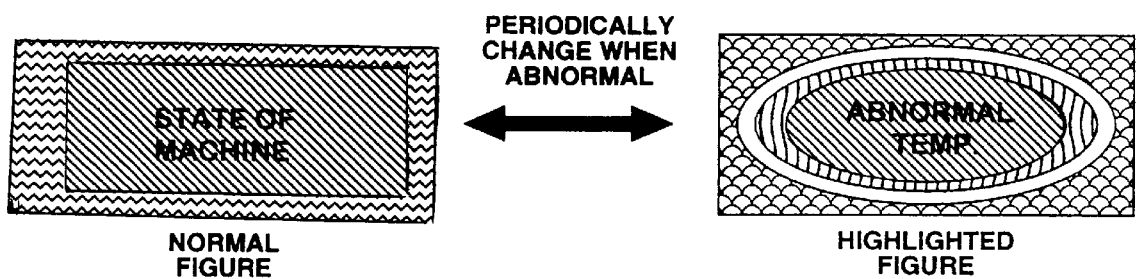
FIG. 26 is a diagram illustrating forms of display in a blinking mode.
Figure 26B:
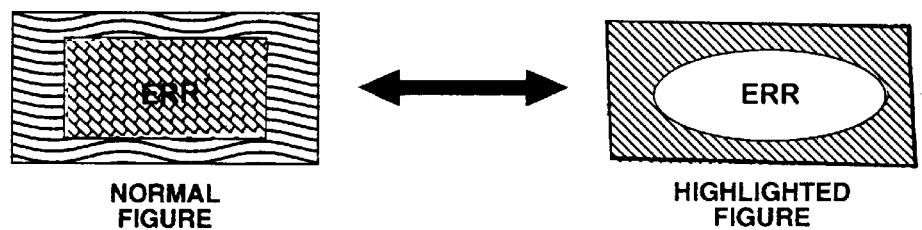

When a code corresponding to this blink is designated, the normal figure and the highlighted figure are displayed by being periodically changed repeatedly, as shown in the part (a) or (b) of FIG. 26.

(4) Special Blink Mode

Figure 27A:
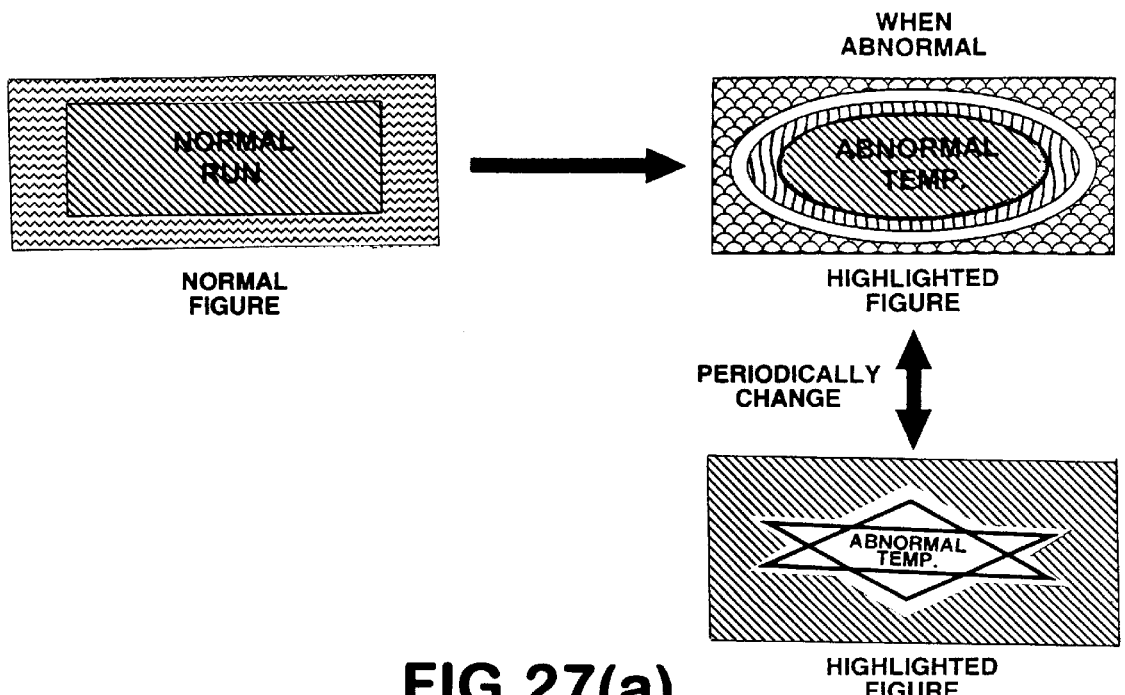
FIG. 27 is a diagram illustrating forms of display in a special blinking mode.
Figure 27B:
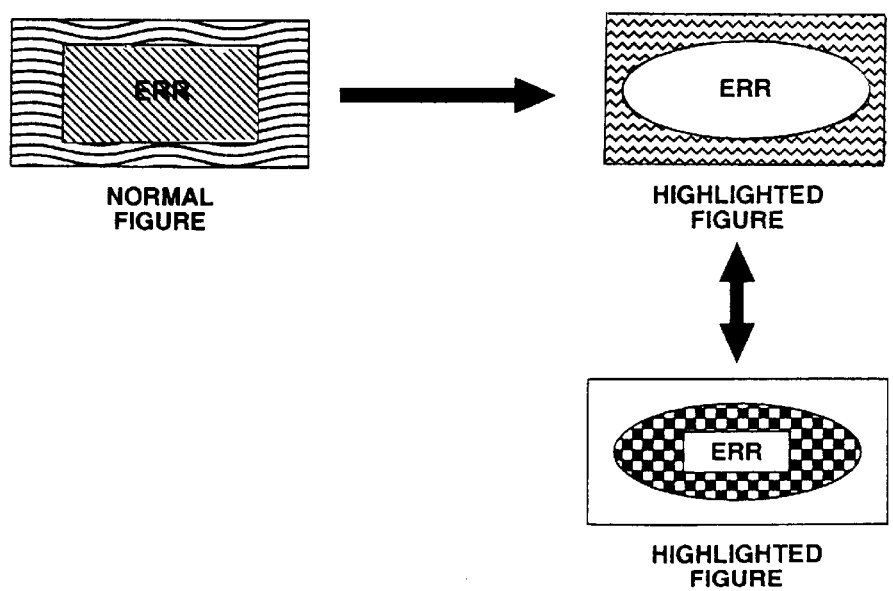

When a code corresponding to this special blink is designated, after the normal figure is changed to one of two highlighted figures, these two highlighted figures are displayed by being periodically changed repeatedly, as shown in the part (a) or (b) of FIG. 27.

(5) Animation Highlighting Mode

The animation highlighting is a case of special blink in which there are three or more highlighted figures. When a code corresponding to the animation highlighting is designated, after the normal figure is changed to one of three or more highlighted figures, the three or more highlighted figures are displayed by being changed cyclically in accordance with a set sequence.

Figure 28:
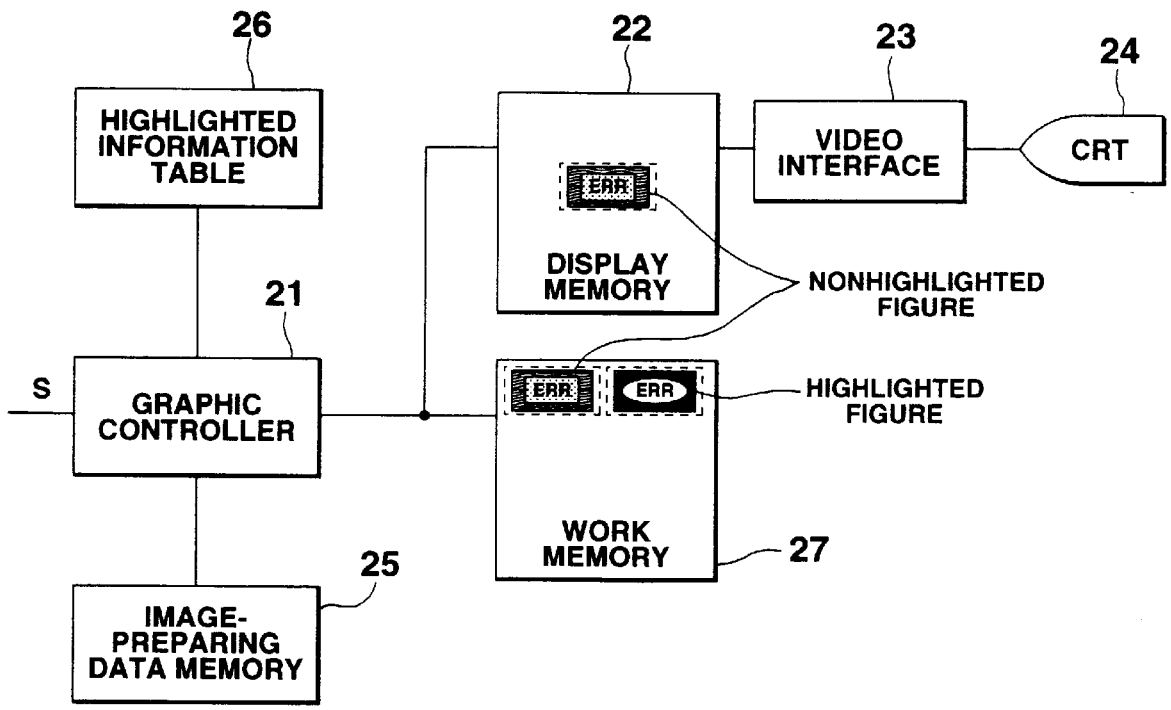
FIG. 28 is a block diagram illustrating an example of the configuration of a second embodiment of the present invention concerning highlighted display.

FIG. 28 shows the embodiment for performing the above-described highlighting display. A graphic controller 21 normally reads image-generating data stored in an image-data generating memory 25 in accordance with an inputted instruction, generates image data corresponding to the display screen to be displayed on a CRT 24 on the basis of the image-generating data thus read, and stores the image data in a display memory 22. The display memory 22 is a bit-map memory having a capacity corresponding one-to-one with the dot configuration on the display screen of the CRT 24, and displays an image corresponding to the stored image data by outputting the stored image data to the CRT 24 via a video interface 23.

In addition to data for generating images of various normal figures to be displayed on the CRT 24, various data for generating highlighted figure images for generating the image data on the aforementioned highlighted figures are stored in the image-generating data memory 25.

Figure 29:
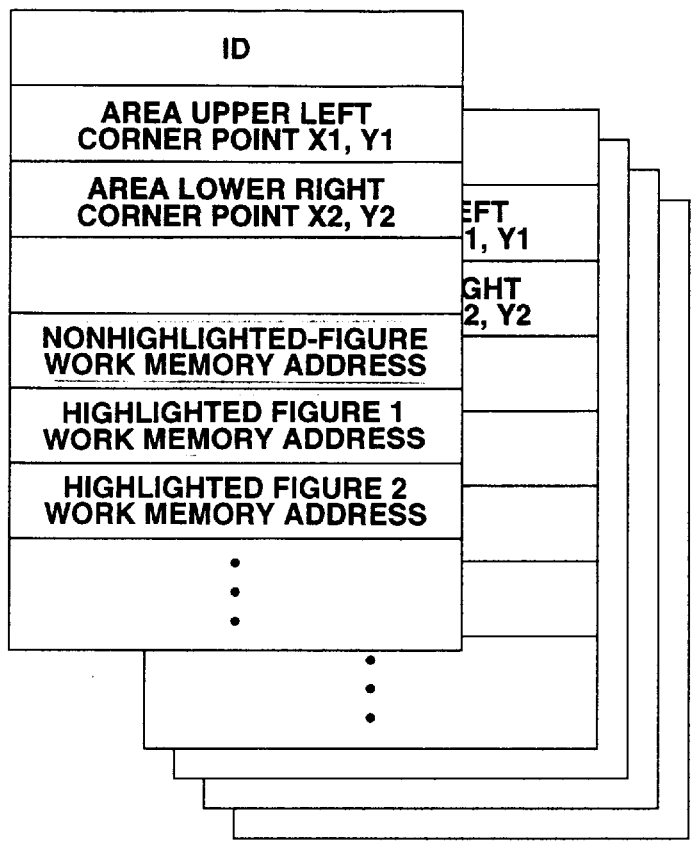
FIG. 29 is a diagram illustrating an example of the data structure of a highlighted information table.

A plurality of pieces of area highlighting information, such as the one shown in FIG. 29, are stored in an highlighting information table 26. Each of these pieces of area highlighting information has an area highlighting information identifier ID for identifying specific area highlighting information, an area upper-left corner point (X1, Y1) and an area lower-right corner point (X2, Y2) which represent the position of an address on the display memory 22 at which the highlighted figure is to be displayed, an nonhighlighted-figure work memory address for indicating an address on a work memory 27 at which a nonhighlighted figure (normal figure) is stored, and a highlighted-figure work memory address indicating an address on the work memory 27 at which a highlighted figure is stored.

The highlighted-figure work memory addresses are designated in a number corresponding to the number of highlighting modes shown in FIG. 2. Namely, in the case of the highlighting mode and the blink mode, one highlighted-figure work memory address is designated; in the case of the special blink mode, two highlighted-figure work memory addresses are designated, and in the case of the animation highlighting mode, work memory addresses in a number identical to that of the highlighted figures which has been set are designated.

The work memory 27 is a memory area in which, when highlighting display of various modes is performed, the nonhighlighted-figure image and various highlighted-figure images generated by the graphic controller 21 are temporarily stored. As the data stored in the work memory 27 is transferred, as required, to the display memory 22, various kinds of highlighted display is performed.

Figure 30:
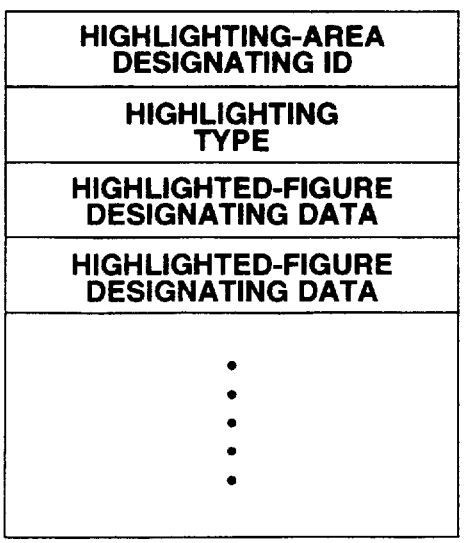
FIG. 30 is a diagram illustrating an example of the data structure of a highlighted display command.
Figure 31:
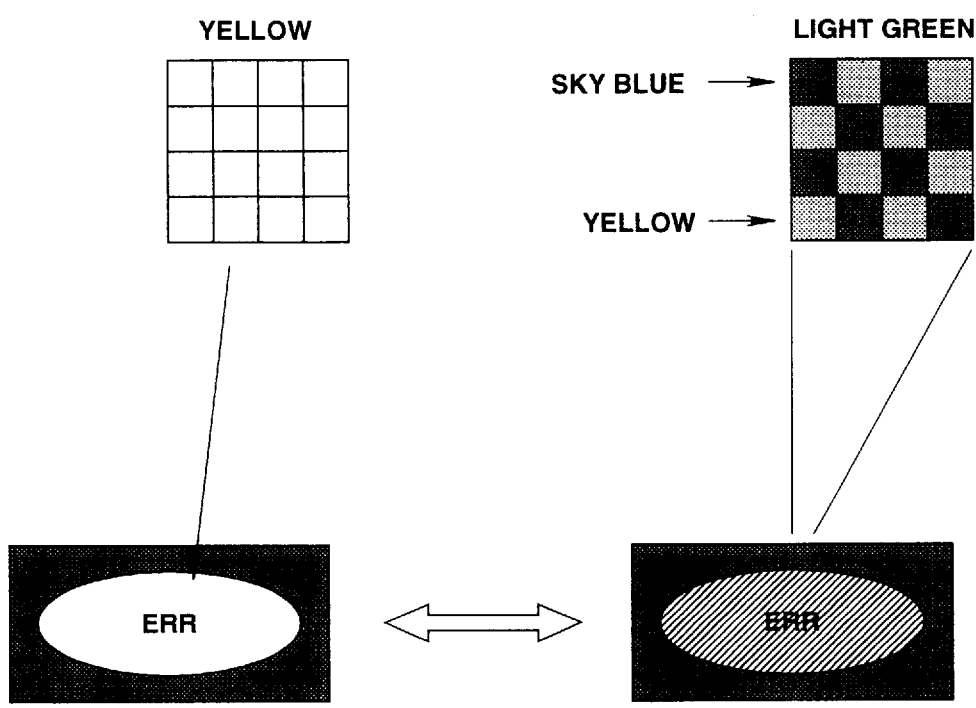
FIG. 31 is a diagram illustrating a modification of the second embodiment of the present invention.

In the above-described configuration, in a case where highlighted display is performed, a highlighting display command S of a format such as the one shown in FIG. 30 is inputted from an external device.

The highlighting display command S has a highlighting-area designating ID for selecting one from the plurality of pieces of area highlighting information stored in the highlighting information table 26, a highlighting type for selecting one of the plurality of highlighting modes shown in FIG. 24 referred to above, and 1 to n highlighted-figure designating data for designating 1–n highlighted-figure-image generating data, used for the highlighting processing from the image-generating data memory 25.

Here, the highlighted-figure designating data are set in a number corresponding to the number of highlighted modes designated by the highlighting type.

Namely, in the case of the highlighting mode and the blink mode, one piece of highlighted-figure designating data is designated; in the case of the special blink mode, two pieces of highlighted-figure designating data are designated, and in the case of the animation highlighting mode, highlighted-figure designating data in a number identical to that of the highlighted figures which has been set are designated.

If such a highlighting display command S is inputted, the graphic controller 21 reads from the highlighting information table 26 the area highlighting information corresponding to the highlighting-area designating ID in the highlighting display command S. Then, the graphic controller 21 reads from the image-generating data memory 25 the highlighted-figure-image generating data corresponding to the highlighted-figure designating data in the highlighting display command S, and generates highlighted-figure image data on the work memory 27 by using the highlighted-figure-image generating data thus read. At this juncture, the highlighted-figure image data is stored in an appropriate blank area in the work memory 27. Then, the graphic controller 21 stores in the column of the highlighted-figure work memory address in the highlighting information table 26 the address in the work memory 27 at which the highlighted-figure image data is stored.

Furthermore, the graphic controller 21 transfers the highlighted-figure image data stored in the work memory 27 to and stores the same at the coordinate position in the display memory 22 designated by the area upper-left corner point (X1, Y1) and the area lower-right corner point (X2, Y2) in the area highlighting information, thereby changing the normal figure to a predetermined highlighted figure.

After such changeover control is effected, the graphic controller 21 controls data transmission from the work memory 27 corresponding to the highlighting mode designated by the highlighting type in the highlighting display command S to the display memory, thereby executing control of highlighted display corresponding to the designated highlighting mode.

Namely, in the case of the highlighting mode, after the normal figure is changed to a highlighted figure in the above-described manner, the figure being displayed in highlight is continued to be displayed until the normal-display command of the code "0" is inputted.

In addition, in the case of the blink mode, after the normal figure is changed to a highlighted figure in the above-described manner, display is controlled in such a manner that this highlighted figure and the normal figure are repeatedly changed in predetermined periods. This blink mode is continued until the normal-display command of the code "0" is inputted.

In addition, in the base of the special blink mode, after the normal figure is changed to a highlighted figure in the above-described manner, display is controlled in such a manner that this highlighted figure and another highlighted figure are repeatedly changed in predetermined periods. This special blink mode is also continued until the normal-display command of the code "0" is inputted.

In addition, in the case of the animation highlighting mode, after the normal figure is changed to a highlighted figure in the above-described manner, display is controlled in such a manner that this highlighted figure and the remaining n highlighted figures are repeatedly changed cyclically in predetermined periods in a predetermined sequence. This animation highlighting mode is also continued until the normal-display command of the code "0" is inputted.

It should be noted that, in the present invention, since highlighted figures are generated separately from nonhighlighted figures as blinking figures, if highlighted display is performed with a different hue, it is unnecessary to take note of complementary colors of a color pamphlet. For this reason, it i possible to simply perform the highlighted display with a different hue by separately generating a figure having an identical shape of the figure and having a different color. Furthermore, in a situation where the number of usable colors is limited, when figures are blinked by being changed periodically, if a highlighted figure which has an identical shape as that of the present highlighted figure and in which a plurality of colors are combined is generated, it is possible to produce a color in which the hue or the contrast of the background and that of the subject character figure are substantially different. Consequently, it is possible to realize high-contrast blinking due to a change in the hue even in cases where the types of color are limited.

INDUSTRIAL APPLICABILITY

The present invention is effectively used as an intelligent operation panel which is connected to various control devices of a factory, a manufacturing plant, a construction vehicle, a monitoring system, and the like and functions as a man-machine interface.

We claim:

1. An intelligent graphic operation panel comprising: a memory in which a plurality of pieces of display screen data for displaying screens used for display of various states in a system and signal inputs are previously registered for respective screens and also component data for the display screen data are previously registered for respective components;
  a display device for displaying a screen corresponding to required display screen data among the registered display screen data for the plurality of screens;
  input means for designating a form of input with respect to an operation switch for signal input in the display screen being displayed on the display device; and
  control means having a screen registration mode in which previously created display screen data and component data are registered in the memory and an operation mode in which the intelligent graphic operation panel operates as an input/output device of the system for executing a required display operation on the display device in accordance with an instruction from an external control device connected thereto and an inner process, and for transmitting information on the operation switch for signal input in the display screen being displayed on the display device to the external control device,
  wherein information, which are:
    fixed display element information for displaying a display element whose display content does not change, among the display data relative to a relevant component;
    variable display element information for displaying a display element whose display content changes, among the display data relative to the relevant component;
    input element information that makes correspondence between the input means and the operation switch for signal input contained in the relevant component;
    component unit operation program information in which required operation procedures for operation in the mode in which the intelligent graphic operation panel operates as the input/output device of the system are described; and
    component arrangement information having stored locations in the memory of the fixed display element information, the variable display element information, the input element information and the component unit operation program information that are contained in the relevant component,
  can be set and registered in association with each component in a registration area for each one of the component data of the memory; wherein the display screen data arranged for each screen unit contain one or a plurality of component data that are previously registered; and wherein the control means interprets the component unit operation program in the component data contained in the display screen data in accordance with the instruction from the external control device or the inner process and executes a process corresponding to a result of the interpretation, when the intelligent graphic operation panel operates in the operation mode and a screen corresponding to the display screen data containing the relevant component data is displayed on the display device.

2. The intelligent graphic operation panel as defined in claim 1 wherein the fixed display element information includes fixed display element information relative to one or a plurality of fixed display elements displayed in the relevant component, and each of the fixed display element information contains fixed display element unit operation program information in which operation procedures for making the fixed display element operate while the relevant component is being displayed are described.

3. The intelligent graphic operation panel as defined in claim 1 wherein the variable display element information includes variable display element information relative to one or a plurality of variable fixed display elements displayed in the relevant component, and each of the variable display element information contains variable display element unit operation program information in which operation procedures for making the variable display element operate while the relevant component is being displayed are described.

4. The intelligent graphic operation panel as defined in claim 1 wherein the input element information includes input element information relative to one or a plurality of input elements displayed in the relevant component, and each of the input element information contains input element unit operation program information in which operation procedures for making the input element operate while the relevant component is being displayed are described.

5. The intelligent graphic operation panel as defined in claim 1 wherein the fixed display element information includes fixed display element information relative to one or a plurality of fixed display elements displayed in the relevant component, each of the fixed display element information contains fixed display element unit operation program information in which operation procedures for making the fixed display element operate appropriately while the relevant component is being displayed are described;

the variable display element information includes variable display element information relative to one or a plurality of variable display elements displayed in the relevant component, each of the variable display element information contains a variable display element information contains a variable display element unit operation program information in which operation procedures for making the variable fixed display element operate while the relevant component is being displayed are described; and the input element information includes input element information relative on one or a plurality of input elements displayed in the relevant component, and each of the input element information contains input element unit operation program information in which operation procedures for making the input element operate while the relevant component is being displayed are described.

6. The intelligent graphic operation panel as defined in claim 1 wherein the input means comprises a transparent touch panel switch laminated on the display device, and the input element information makes correspondence between a position of the signal input operation switch included in the relevant screen and a coordinates position of the transparent touch panel.

7. The intelligent graphic operation panel as defined in claim 1 wherein the component unit operation program information includes a procedure concerning data exchange with the external control device while the relevant display screen is being displayed.

8. The intelligent graphic operation panel as defined in claim 1 wherein the component unit operation program information includes a procedure concerning changing of the relevant display screen.

9. The intelligent graphic operation panel as defined in claim 1 wherein the component unit operation program information includes a predetermined arithmetic processing concerning data display of the relevant display screen.

10. An intelligent graphic operation panel comprising a memory in which a plurality of pieces of display screen data for displaying screens used for display of various states and signals inputs are previously registered for respective screens and in which component data for the display screen data are also previously registered for respective components; a display device for displaying a screen corresponding to required display screen data among the registered display screen data for the plurality of screens; input means for designating a form of input with respect to an operation switch for signal input in the display screen being displayed on the display device; and control means for executing a required display operation on the display device in accordance with an instruction from an external control device connected thereto and an inner process and for transmitting information on the operation switch for signal input in the display screen being displayed on the display device to the external control device, wherein the display screen data for each screen includes, in correspondence with the relevant display screen, either part of or all of information, which are:

component data corresponding to one or a plurality of components contained in a relevant screen;

first fixed display element information for displaying a display element whose display content does not change, among the display elements displayed on the relevant screen other than said one or the plurality of components;

first variable display element information for displaying a display element whose display content changes, among the display elements displayed on the relevant screen other than said one or the plurality of components;

first input element information that effects correspondence between the input means and the operation switch for signal input contained in the relevant component, among the display elements displayed on the relevant screen other than said one or the plurality of components;

screen unit operation program information in which operation procedures for achieving a function of these display elements, with respect to the display element displayed on the relevant screen other than said one or the plurality of components, while the relevant screen is being allocated on the display device and during an operation period of the intelligent graphic operation panel; and screen arrangement information having stored locations in the memory of the first fixed display element information, the first variable display element information, the first input element information and the screen unit operation program information that are contained in the relevant screen, wherein the component data contained in the display screen data includes, in correspondence with the relevant component, part of or all of the information, which are;

second fixed display element information for displaying a display element whose display content does not change, among the display data relative to the relevant component;

second variable display element information for displaying a display element whose display content changes, among the display data relative to the relevant component;

second input element information that effects correspondence between the input means and the operation switch for signal input contained in the relevant component;

component unit operation program information in which required operation procedures for achieving a function of the relevant component itself, while the relevant component is being allocated on the display device and during the operation period of the intelligent graphic operation panel are described;

component arrangement information having stored locations in the memory of the second fixed display element information, the second variable display element information, the second input element information and the component unit operation program information that are contained in the relevant component; and component position data indicative of a display position of the relevant component on the screen, and wherein the control means interprets the screen unit operation program and the component unit operation program which are contained in the relevant screen data in accordance with an instruction from the external control device or an inner process, to execute a process corresponding to a result of the interpretation.

11. The intelligent graphic operation panel as defined in claim 10 wherein the input means comprises a transparent touch panel switch laminated on the display device, the first input element information effects correspondence between a position on the screen of the operation switch for signal input contained in the relevant screen and a coordinates position of the transparent touch panel, and the second input element information makes correspondence between a position on the screen of the operation switch for signal input contained in the relevant component and the coordinates position of the transparent touch panel.

12. The intelligent graphic operation panel as defined in claim 10 wherein the screen unit operation program information and the component unit operation program information include a procedure relative to data exchange with the external control device when the relevant display screen is being displayed.

13. The intelligent graphic operation panel as defined in claim 10 wherein the screen unit operation program information and the component unit operation program information include a procedure relative to change of the relevant display screen.

14. The intelligent graphic operation panel as defined in claim 10 wherein the screen unit operation program information and the component unit operation program information include a predetermined arithmetic processing relative to data display of the relevant display screen.

15. The intelligent graphic operation panel as defined in claim 10 wherein the first fixed display element information, which is contained in the display screen data for each screen, includes fixed display element information relative to one or a plurality of fixed display elements displayed on the relevant screen, each fixed display element information includes fixed display element unit operation program information in which operation procedures for making the fixed display element operate while the relevant screen is being displayed are described, wherein the first variable display element information, which is contained in the display screen data for each screen, includes variable display element information relative to one or a plurality of variable display elements displayed on the relevant screen, each variable display element information includes variable display element unit operation program information in which operation procedures for making the variable display element operate while the relevant screen is being displayed are described, and wherein the first input element information, which is contained in the display screen data for each screen, includes input element information relative to one or a plurality of input elements displayed on the relevant screen, each input element information includes input element unit operation program information in which operation procedures for making the input element operate while the relevant screen is being displayed are described.

16. The intelligent graphic operation panel as defined in claim 10 wherein the second fixed display element information, which is contained in the component data contained in the display screen data, includes fixed display element information relative to one or a plurality of fixed display elements displayed on the relevant component, each fixed display element information includes fixed display element unit operation program information in which operation procedures for making the fixed display element operate while the relevant screen is being displayed are described, the second variable display element information, which is contained in the component data contained in the display screen data, includes variable display elements information relative to one or a plurality of variable display elements displayed on the relevant component, each variable display element information includes variable display element unit operation program information in which operation procedures for making the variable display element operate while the relevant screen is being displayed are described, and the second input element information, which is contained in the component data contained in the display screen data, includes input element information relative to one or a plurality of input elements displayed on the relevant component, and each input element information includes input element unit operation program information in which operation procedures for making the input element operate while the relevant screen is being displayed are described.

* * * * *